(12) United States Patent
Miles et al.

(10) Patent No.: US 9,195,513 B2
(45) Date of Patent: Nov. 24, 2015

(54) SYSTEMS AND METHODS FOR MULTI-TENANCY DATA PROCESSING

(71) Applicant: SAS Institute Inc., Cary, NC (US)

(72) Inventors: Brian Oneal Miles, Cary, NC (US); Michelle Wilkie, Cary, NC (US)

(73) Assignee: SAS Institute Inc., Cary, NC (US)

( * ) Notice: Subject to any disclaimer, the term of this patent is extended or adjusted under 35 U.S.C. 154(b) by 429 days.

(21) Appl. No.: 13/773,850

(22) Filed: Feb. 22, 2013

(65) Prior Publication Data

US 2014/0245305 A1    Aug. 28, 2014

(51) Int. Cl.
*G06F 9/54* (2006.01)
*G06F 9/50* (2006.01)

(52) U.S. Cl.
CPC .................................. *G06F 9/5083* (2013.01)

(58) Field of Classification Search
CPC .................................................. G06F 9/5083
See application file for complete search history.

(56) References Cited

U.S. PATENT DOCUMENTS

| 8,122,055 | B2 | 2/2012 | Grewal et al. |
| 8,195,743 | B2 | 6/2012 | Janedittakarn et al. |
| 2010/0005443 | A1* | 1/2010 | Kwok et al. ................... 717/100 |
| 2010/0077449 | A1* | 3/2010 | Kwok et al. ....................... 726/3 |
| 2010/0125612 | A1 | 5/2010 | Amradkar et al. |
| 2012/0109947 | A1 | 5/2012 | Yu et al. |
| 2012/0173589 | A1 | 7/2012 | Kwon et al. |
| 2013/0066945 | A1* | 3/2013 | Das et al. ....................... 709/203 |
| 2014/0068611 | A1* | 3/2014 | McGrath et al. ................... 718/1 |

* cited by examiner

*Primary Examiner* — Syed Roni
(74) *Attorney, Agent, or Firm* — Bell & Manning, LLC

(57) ABSTRACT

System and methods are provided for rotating real time execution of data models using an application instance. Input data are received for real time execution of a plurality of data models. An application instance is assigned for executing the plurality of data models simultaneously. Resources of the application instance are automatically distributed based on a set of rotation factors. The plurality of data models are executed simultaneously using one or more data processors. Execution results for one or more of the plurality of data models are output.

38 Claims, 20 Drawing Sheets

| model_id | customer_id | model_name | model_algo | model_desc | job_priority | model_path | model_exec_script |
|---|---|---|---|---|---|---|---|
| 1 | 1 | NCAA Bball Win Pct | Scoring | Predicted Win pct | 1 | \\sashq\root\u\sasxw\PublicRTIM\Te... | %NCAA_Win_Pct() |

*Fig. 15A*

| input_field_id | model_id | field_name | field_informat | field_format |
|---|---|---|---|---|
| 11 | 1 | node_action | $6. | $6. |
| 12 | 1 | teamID | $22. | $22. |
| 13 | 1 | FG_Pct | 8.2 | 8.2 |
| 14 | 1 | asst | 8.3 | 8.3 |
| 15 | 1 | turnOvers | 8.3 | 8.3 |
| 16 | 1 | Three_FG_... | 8.3 | 8.3 |
| 17 | 1 | Free_th_ma... | 8.3 | 8.3 |
| 18 | 1 | reb_total | 8.3 | 8.3 |
| 19 | 1 | pers_fouls | 8.3 | 8.3 |

*Fig. 15B*

| parameter_id | model_id | param_name | param_value | start_dttm | end_dttm |
|---|---|---|---|---|---|
| 10 | 1 | weightTest | .5 | 1640995200 | 253591430... |

*Fig. 15C*

| MEC_id | model_id | inJndiCtxtFact | inConnFactory | inFileOptions | outJndiCtxtFact | outConnfactory | outFileOptions | inQueue_id | outQueue_id |
|---|---|---|---|---|---|---|---|---|---|
| 100 | 1 | org.apache... | ConnectionF... | | | | | | 200 |
| 101 | 1 | org.apache... | ConnectionF... | | | | | 100 | 201 |
| 102 | 1 | org.apache... | ConnectionF... | | | | | 101 | 200 |
| 103 | 1 | org.apache... | ConnectionF... | | | | | 100 | 201 |
| 104 | 1 | org.apache... | ConnectionF... | | | | | 101 | 200 |
| 105 | 1 | org.apache... | ConnectionF... | | | | | 101 | 201 |

Fig. 16A

| MEC_id | MEC_name | MEC_desc | MEC_type | MEC_timeout | MEC_eof_check_ | MEC_delivery_ | MEC_rotation_ | MEC_rotation_ | MEC_rotation_ |
|---|---|---|---|---|---|---|---|---|---|
| 100 | Test MEC 100 | This node is a te... | 0 | 0 | STOP | nonpersistent | N | -1 | -1 |
| 101 | Test MEC 101 | This node is a te... | 0 | 0 | STOP | nonpersistent | N | -1 | -1 |
| 102 | Test MEC 102 | This node is a te... | 0 | 0 | STOP | nonpersistent | N | -1 | -1 |
| 103 | Test MEC 103 | This node is a te... | 0 | 0 | STOP | nonpersistent | N | -1 | -1 |
| 104 | Test MEC 104 | This node is a te... | 0 | 0 | STOP | nonpersistent | N | -1 | -1 |
| 105 | Test MEC 105 | This node is a te... | 0 | 0 | STOP | nonpersistent | N | -1 | -1 |

| MEC_log_id | MEC_id | timestamp | server | action | details |
|---|---|---|---|---|---|
| 1 | 100 | 1657124554.753 | AALVM03 | START | NCAA Bball Win Pct |
| 2 | 101 | 1657124557.218 | AALVM03 | START | NCAA Bball Win Pct |
| 3 | 102 | 1657125554.45 | AALVM04 | START | NCAA Bball Win Pct |
| 4 | 104 | 1657125621.835 | AALVM05 | START | NCAA Bball Win Pct |
| 5 | 105 | 1657125624.862 | AALVM05 | START | NCAA Bball Win Pct |
| 6 | 101 | 1657467181.192 | AALVM03 | START | NCAA Bball Win Pct |
| 7 | 100 | 1657467184.048 | AALVM03 | START | NCAA Bball Win Pct |
| 8 | 103 | 1657467189.406 | AALVM04 | START | NCAA Bball Win Pct |
| 9 | 105 | 1657467197.259 | AALVM05 | START | NCAA Bball Win Pct |
| 10 | 104 | 1657467200.112 | AALVM05 | START | NCAA Bball Win Pct |

Fig. 17A

| broker_id | server_name | url | type | url_options |
|---|---|---|---|---|
| 100 | AALVM01 | tcp://10.16.12.113:61... | Master | jms.OptimizeAcknowledge=true&randomize=false&initialReconnectDelay=10 |

Fig. 17B

| queue_id | queue_name | broker_id |
|---|---|---|
| 100 | req1 | 100 |
| 100 | req2 | 100 |

SYSTEMS AND METHODS FOR MULTI-TENANCY DATA PROCESSING

FIELD

The technology described in this patent document relates generally to data processing, and more particularly to data processing in a multi-tenant system.

BACKGROUND

A multi-tenant system often hosts software applications for many tenants (e.g., customers, business organizations), where a single instance of a software application may be accessed (e.g., through a network) and used by multiple tenants. Compared with a multi-instance system where separate software application instances are provided for different customers, tenants in a multi-tenant system can share a single software application instance, which usually reduces costs and improves efficiency. In addition, the tenants in a multi-tenant system share platforms and infrastructure components for processing and storing data.

SUMMARY

In accordance with the teachings described herein, systems and methods are provided for rotating real time execution of data models using an application instance. Input data are received for real time execution of a plurality of data models. An application instance is assigned for executing the plurality of data models simultaneously. Resources of the application instance are automatically distributed based on a set of rotation factors. The plurality of data models are executed simultaneously using one or more data processors. Execution results for one or more of the plurality of data models are output.

For example, at least one of an initialization or a reset of the application instance is executed. The executing of the initialization or the reset comprises, determining the plurality of data models, determining the set of rotation factors, determining rotation data associated with the set of rotation factors for the plurality of data models, and determining a rotation algorithm for distributing the resources of the application instance for executing the plurality of data models simultaneously. Further, after a predetermined period of time, the rotation data associated with the rotation factors are recalculated based on historical information and current information. The distribution of resources of the application instance is adjusted for executing the plurality of data models.

As an example, automatically distributing resources of the application instance based on a set of rotation factors comprises, determining whether a rotation factor is time-dependent, responsive to determining that the rotation factor is time-dependent, calculating an aggregate of one or more rotation attributes of the rotation factor, and normalizing rotation data associated with the rotation factor across the plurality of data models. In addition, automatically distributing resources of the application instance based on a set of rotation factors comprises applying a weight of the rotation factor to the normalized rotation data of each of the plurality of data models, aggregating the weighted rotation data of the plurality of data models, and normalizing the aggregated weighted rotation data. As an example, the weight of the rotation factor is in a range of 0-1.

In another example, automatically distributing resources of the application instance based on a set of rotation factors comprises, determining whether a rotation factor is time-dependent. Responsive to determining that the rotation factor is time-dependent, whether a rotation attribute of a rotation factor is associated with a trend is determined. Responsive to determining that the rotation attribute is associated with a trend, the trend is calculated as part of attribute data associated with the rotation attribute. A lag weight is applied to the attribute data associated with the rotation attribute. Further, the attribute data associated with the rotation attribute are normalized across the plurality of data models. An attribute weight is applied to the normalized attribute data. For example, the lag weight is applied through a weighting method selected from a group consisting of an equal weight method, a linear lag weighting method, and an exponential weighting method.

In yet another example, metric data associated with the rotation data are determined. The metric data includes an overall historical aggregate, a historical aggregate by period, a recent history of the application instance, a weighted period input, and a time independent input. The overall historical aggregate includes historical data aggregated across periods over time. The historical aggregate by period includes historical data aggregated by period over time. The recent history of the application instance includes real-time information aggregated by the application instance. The weighted period input is received for assigning a weight to a data model by period. The time independent input includes a value for a data model that is time insensitive.

As an example, the set of rotation factors include a priority for a data model, an overall historical demand, a historical demand for period, a current demand, an overall historical trend, a historical demand trend for a period, a current demand trend, and a model complexity. The application instance includes a data step loop. The plurality of data models is associated with one or more input queues and one or more output queues, the input data being received through the input queues, the execution results being output through the output queues. The input data for a data model may be received in response to a web service call. The execution results for the data model may be output through an output queue associated with the data model.

In another embodiment, a computer-implemented system is provided for rotating real time execution of data models using an application instance. The example system comprises one or more data processors, and a computer-readable storage medium encoded with instructions for commanding the data processors to execute operations. The operations may include, receiving input data for real time execution of a plurality of data models, assigning an application instance for executing the plurality of data models simultaneously, automatically distributing resources of the application instance based on a set of rotation factors, executing the plurality of data models simultaneously, and outputting execution results for one or more of the plurality of data models.

In yet another embodiment, a non-transitory computer readable medium comprising programming instructions is provided for rotating real time execution of data models using an application instance. The programming instructions configured to cause a processing system to execute operations including, receiving input data for real time execution of a plurality of data models, assigning an application instance for executing the plurality of data models simultaneously, automatically distributing resources of the application instance based on a set of rotation factors, executing the plurality of data models simultaneously, and outputting execution results for one or more of the plurality of data models.

In yet another embodiment, a computer-implemented system is provided for rotating real time execution of data models using an application instance. An example system includes, one or more input queues configured to receive input data for real time execution of a plurality of data models, a processing system configured to assign an application instance for executing the plurality of data models simultaneously, automatically distribute resources of the application instance based on a set of rotation factors, and execute the plurality of data models simultaneously, and one or more output queues configured to output execution results for one or more of the plurality of data models.

BRIEF DESCRIPTION OF THE DRAWINGS

FIG. 15(a) depicts an example showing metadata for the new model.

FIG. 15(b) depicts an example showing inputs for the new model.

FIG. 15(c) depicts an example showing parameters for the new model.

FIG. 16(a) depicts an example showing the new model is assigned to MECs.

FIG. 16(b) depicts an example showing MECs associated with the new model.

FIG. 16(c) depicts an example showing log formation for the new model.

FIG. 17(a) depicts an example showing the broker information with relevant connection parameters.

FIG. 17(b) depicts an example showing the queue name and assignment to a broker on which the queue is created.

DETAILED DESCRIPTION

When a single application instance is used for executing multiple data models in a multi-tenant system, resources of the application instance are often distributed for executing these data models. Embodiments of systems described herein can provide effective mechanisms to intelligently distribute, in real time, the resources of the application instance for executing the data models.

Figure 1:
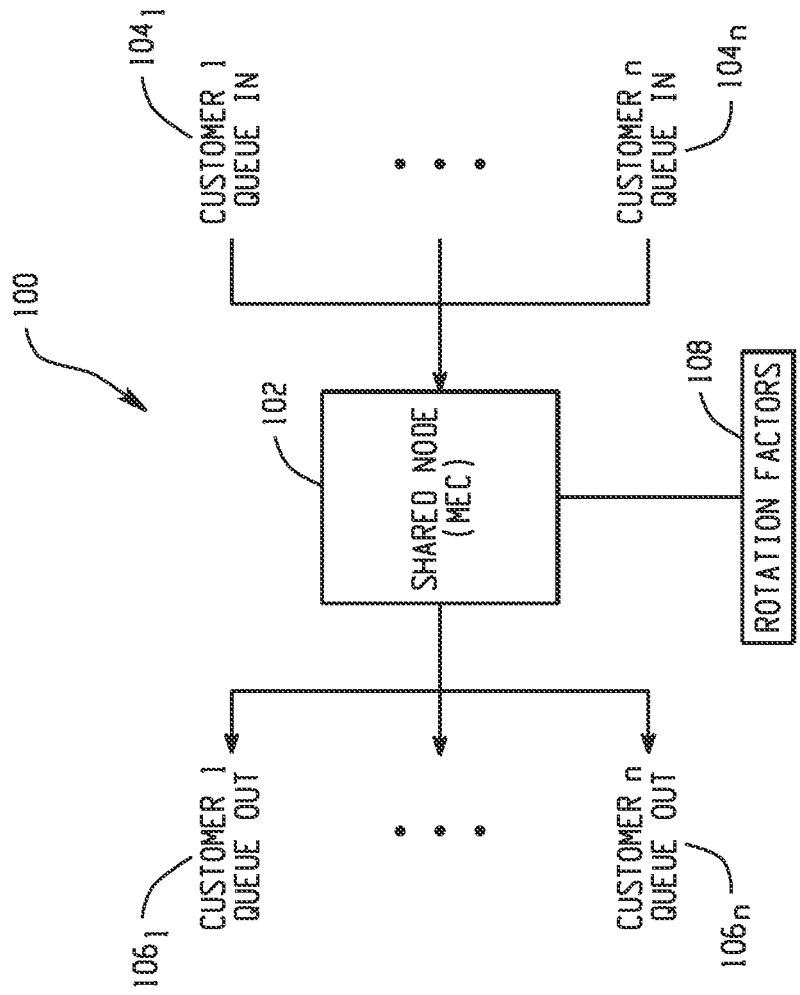
FIG. 1 depicts an example multi-tenant system for real time execution of data models.

FIG. 1 depicts an example multi-tenant system for real time execution of data models. As shown in FIG. 1, the multi-tenant system 100 assigns a node 102 (e.g., an application instance) to execute multiple data models simultaneously. Input data are received through multiple input queues $104_1, \ldots, 104_n$ (n is an integer) for the data models respectively. Resources of the node 102 (i.e., a model execution consumer) are automatically distributed among the data models based on a set of rotation factors 108 in real time so that the node 102 may be used efficiently. Execution results are output through multiple output queues $106_1, \ldots, 106_n$ for the data models respectively.

Specifically, each of the data models may have a particular utilization pattern of the node 102, i.e., a model execution consumer (MEC). As an example, two data models use the MEC, where a first data model uses the MEC mostly in early mornings (e.g., 1 am-3 am) and a second data model uses the MEC mostly in late afternoons (e.g., 4 pm-5 pm). A weighted combination of the rotation factors 108 that indicate the utilization patterns of these data models may determine or rotate the workload of the MEC for both data models in real time, so that the MEC can be used more for the first data model in the early mornings, and more for the second data model in the late afternoons.

Figure 2:
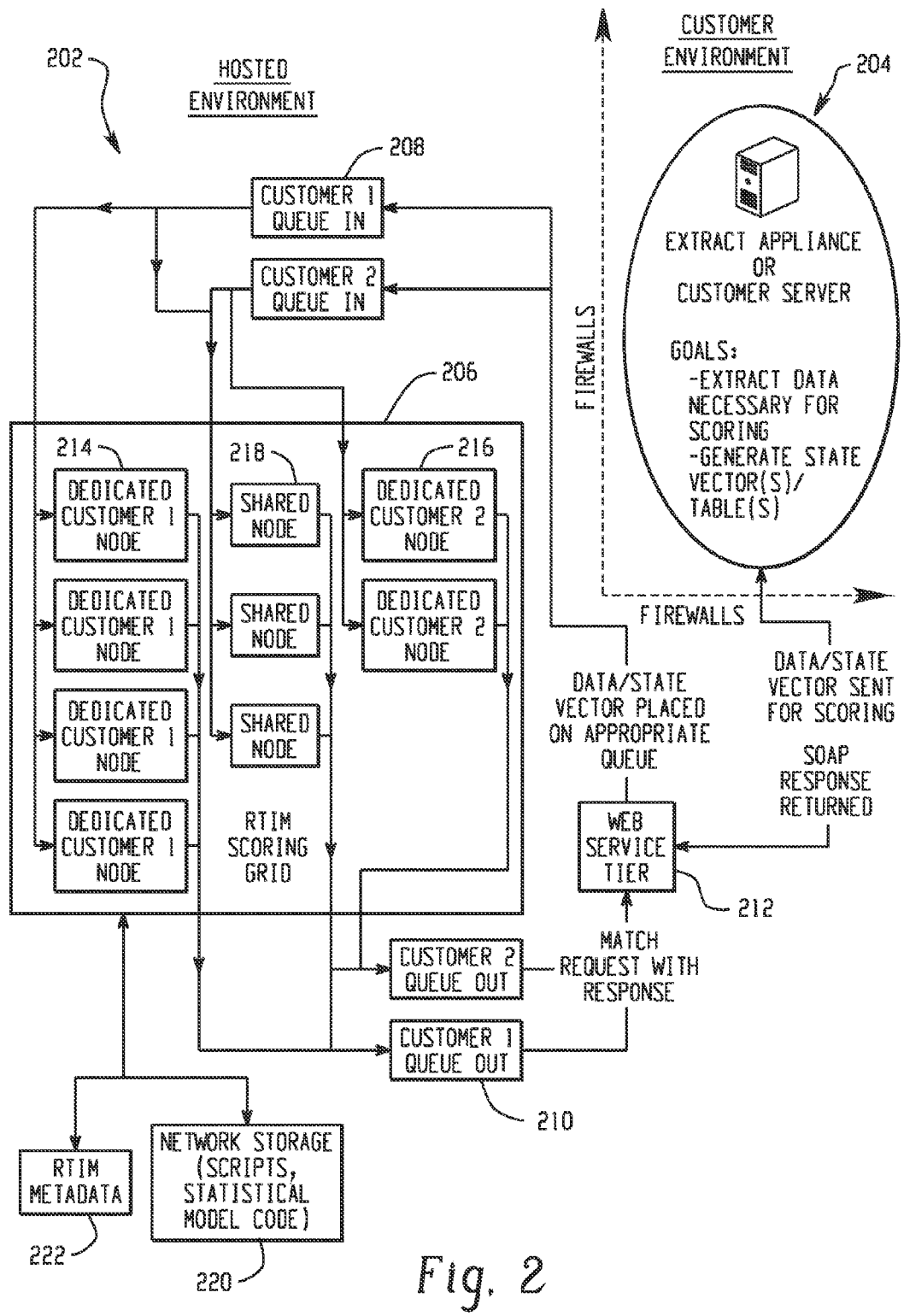
FIG. 2 depicts an example computer environment where a multi-tenant system is used for real time execution of data models.

FIG. 2 depicts an example computer environment where a multi-tenant system is used for real time execution of data models. As shown in FIG. 2, a multi-tenant system 202 in a hosted environment receives input data (e.g., data/state vectors) from one or more customers 204 in a customer environment (e.g., through one or more input queues 208), executes data models using a scoring grid 206 that includes one or more nodes (i.e., model execution consumers), and outputs execution results (e.g., on one or more output queues 210) to be collected by the customers 204.

For example, the input data (e.g., data/state vectors) may be extracted by an extract appliance or from a customer server in the customer environment. The scoring grid 206 receives the input data from the input queues 208 or by a web service call (e.g., through a web service tier 212), and executes multiple data models (e.g., statistical models) based on the received input data. As shown in FIG. 2, the scoring grid 206 may dedicate some nodes for a particular customer (e.g., nodes 214, nodes 216), or assign nodes to be shared among multiple customers (e.g., nodes 218). The workload of the shared nodes 218 may be determined or rotated in real time based on a set of rotation factors. For example, a node (i.e., a MEC) is essentially a data step loop, and may be spawned off on any piece of hardware in the hosted environment that can access the data model and a small partition of network storage 220.

As an example, a data model may include many transactions that exist on a single input queue or are distributed across multiple input queues. Further, data models may be deployed as compiled Macros and loaded into memory. In addition, a data model (e.g., a statistical model) may have a set of input fields, which may be defined in model metadata 222, for each transaction that the data model needs to execute against. In one embodiment, the web service tier 212 is omitted, and the customers 204 output data to the input queues 208 and receive data from the output queues 210. In another embodiment, an additional reporting/logging queue may be implemented for event notification and monitoring. For example, all data (e.g., the input data, intermediate data generated in process, execution results) are loaded into memory so that little or no disk space is needed.

Figure 3:
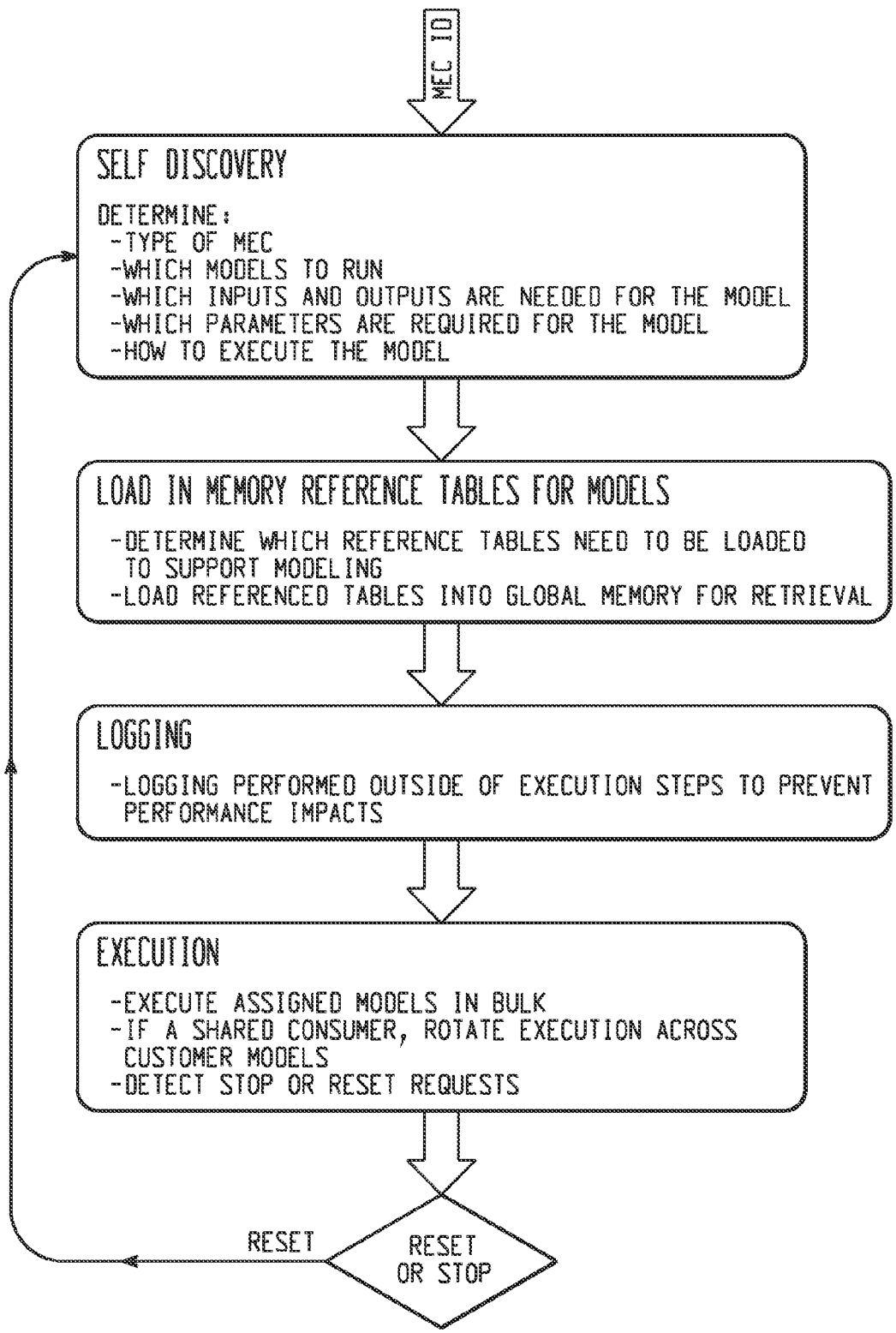
FIG. 3 depicts an example logical lifecycle of a shared model execution consumer (MEC).

FIG. 3 depicts an example logical lifecycle of a shared model execution consumer (MEC). As shown in FIG. 3, a MEC goes through a self-discovery process to be assigned to one or more data models. Reference tables for the data models are loaded into memory. In addition, a logging process is performed, and the assigned data models are executed using the MEC. Then, the MEC is reset or stopped.

Specifically, the self-discovery process starts with an identification of the MEC, and determines initialization information for the MEC, such as the type of the MEC, which data models to run, inputs and outputs for the data models, parameters required for the data models, and an execution plan for the data models. Reference tables needed to support the execution of the data models may be determined and loaded into memory. After performing a logging process (e.g., recording the identification of the MEC, time stamp, etc.), the assigned data models may be executed in bulk. If a MEC is shared by multiple data models, the data models may be executed simultaneously, and the workload of the MEC may be determined and reassessed among the data models in real time. If a request to reset the MEC is detected during the execution of the data models, the MEC may be reset to go through the self-discovery process again. If a request to stop the MEC is detected, then the MEC may be stopped to end the logical lifecycle. For example, a message broker may be used to separate different customers. The self-discovery process of the MEC may further include determining which message broker, which input queue(s) and/or which output queue(s) to communicate with the data model and the MEC.

Figure 4:
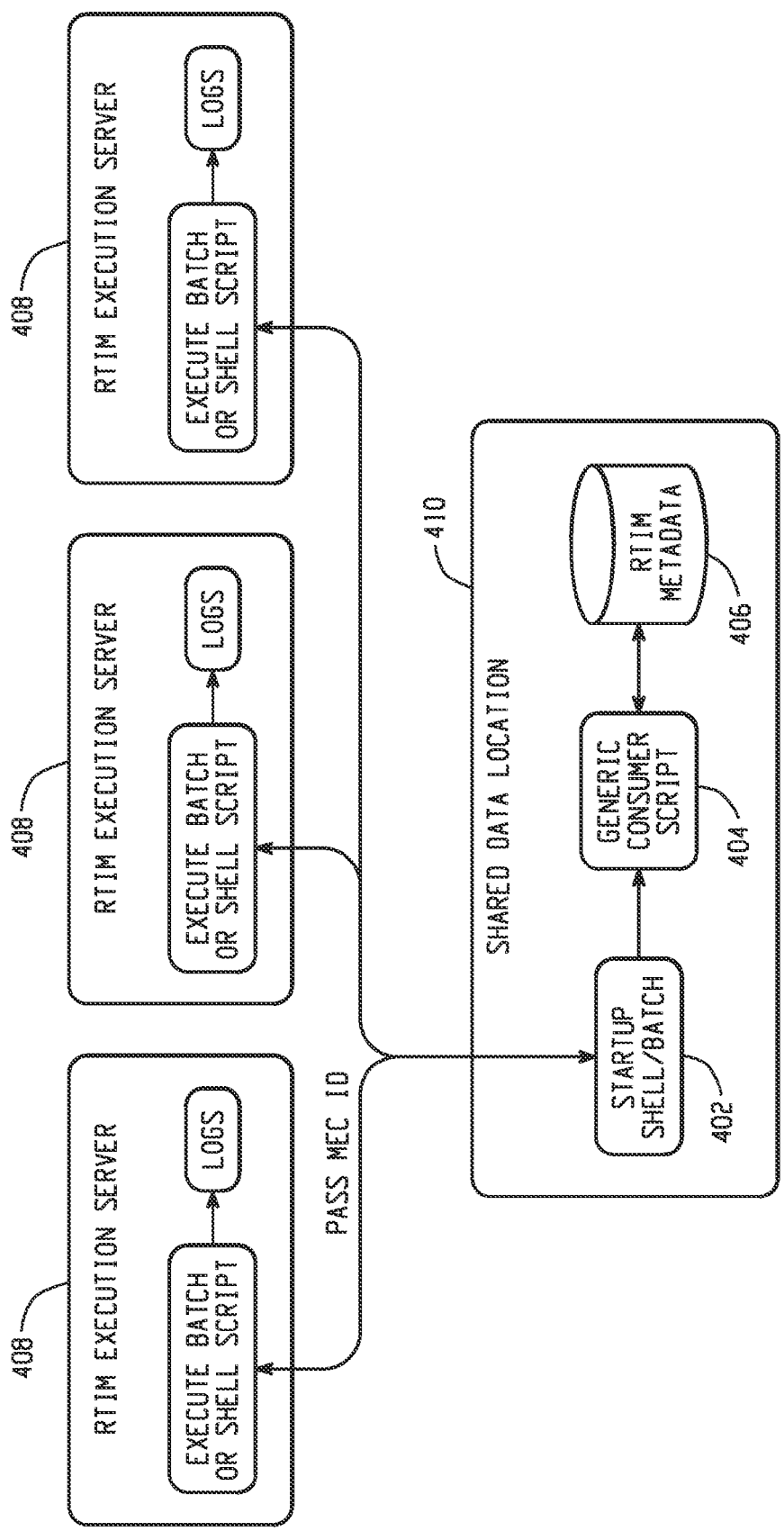
FIG. 4 depicts an example physical lifecycle of a shared MEC.

FIG. 4 depicts an example physical lifecycle of a shared MEC. As shown in FIG. 4, metadata 406 at a shared data location 410 is queried for initializing/resetting a MEC. A startup shell/batch 402 is generated based on a generic consumer script 404 and the metadata 406. One or more execution servers 408 may be implemented to receive a MEC identification based on the startup shell/batch 402 and execute shell/batch scripts for initializing/resetting the MEC.

Referring back to FIG. 1 and FIG. 2, a set of rotation factors may be used to intelligently distribute, in real time, resources of a MEC for executing multiple data models simultaneously. Rotation metrics (e.g., volume, demand, etc.), including historical metrics and current metrics, can be obtained for determining the set of rotation factors. For example, each day may be broken into a number of time segments (e.g., 96 time segments, each segment including 15 minutes). The historical metrics and the current metrics may be obtained for these time segments. As an example, historical customer transaction records/volumes can be used to seed the data initially.

To generate the historical metrics and the current metrics, five types of metrics data may be obtained, such as an overall historical aggregate, a historical aggregate by period, a recent history of the MEC, a weighted period input, and a time independent input. For example, the overall historical aggregate includes the aggregate data (e.g., sum, mean, median, etc.) required to generate the rotation metrics (e.g., volume, demand, etc.) across periods over time for a data model. The historical aggregate by period includes the aggregate data required to generate the rotation metrics by period (e.g., year, quarter, month, week, day) over time for a data model. The recent history of the MEC includes real-time information aggregated, maintained, and derived by the MEC. Further, the weighted period input is received for assigning a weight to the data model by period to support the rotation factors that may fluctuate by period. In addition, the time independent constant input includes a value or weight given to the data model that is not time sensitive (constant) using a 0 to 1 scale.

FIGS. 5A-5D depict example diagrams of aggregated rotation metrics of three data models that are executed by a shared MEC simultaneously. The specifics of the three data models are shown in Table 1.

TABLE 1

|  | Model 1 | Model 2 | Model 3 |
| --- | --- | --- | --- |
| Model name | Holiday shopping | Construction Worker's Comp Claims | Hurricane Property Claims |
| High volume period | October-February | May-August | July 15-October 15 |
| Peak time | 1 am-4 am | 10 am-8 pm | 9 am-11 am and 12 pm-4 pm |
| High peak (transactions/ message per period) | 100k | 10k | 100k |
| Low alley (transactions/ message per period) | 50 | 10 | 0 |

Figure 5A:
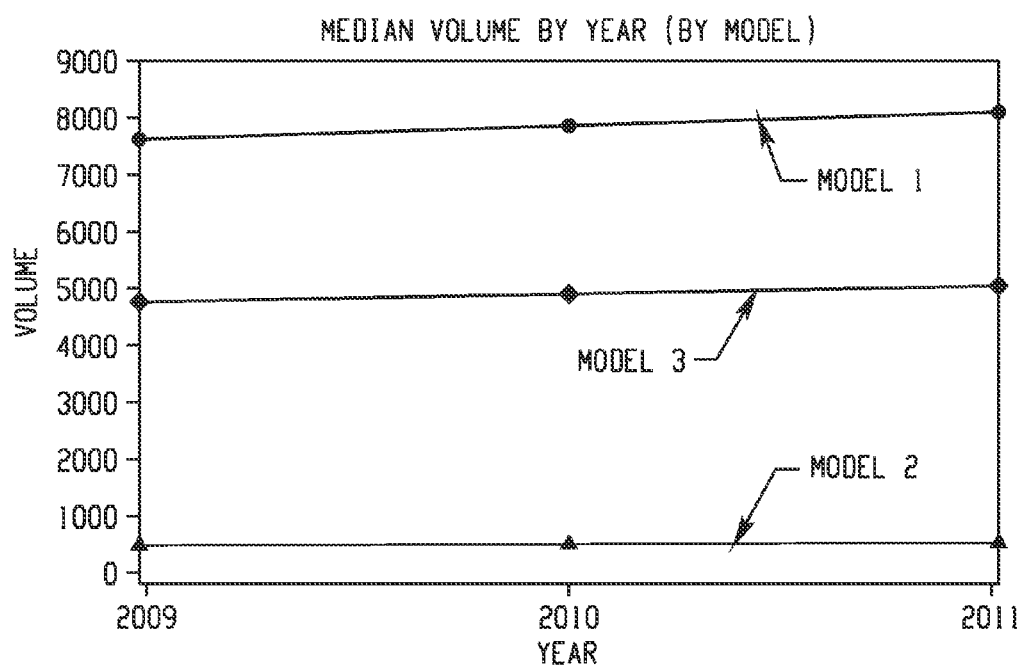
FIGS. 5A-5D depict example diagrams of aggregated rotation metrics of three data models that are executed by a shared MEC simultaneously.
Figure 5B:
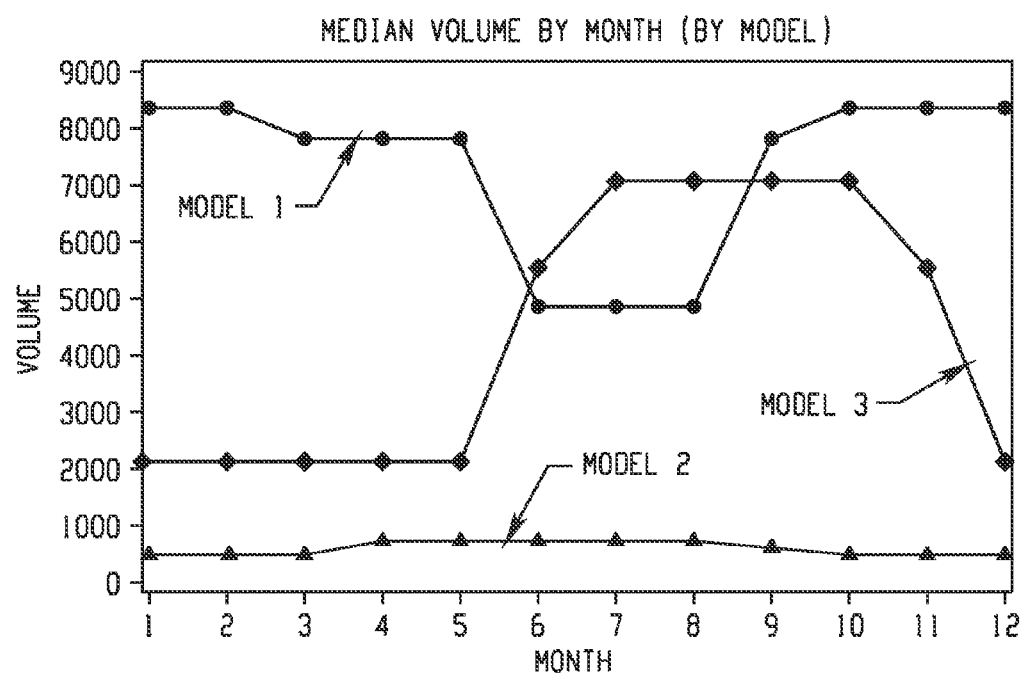
Figure 5C:
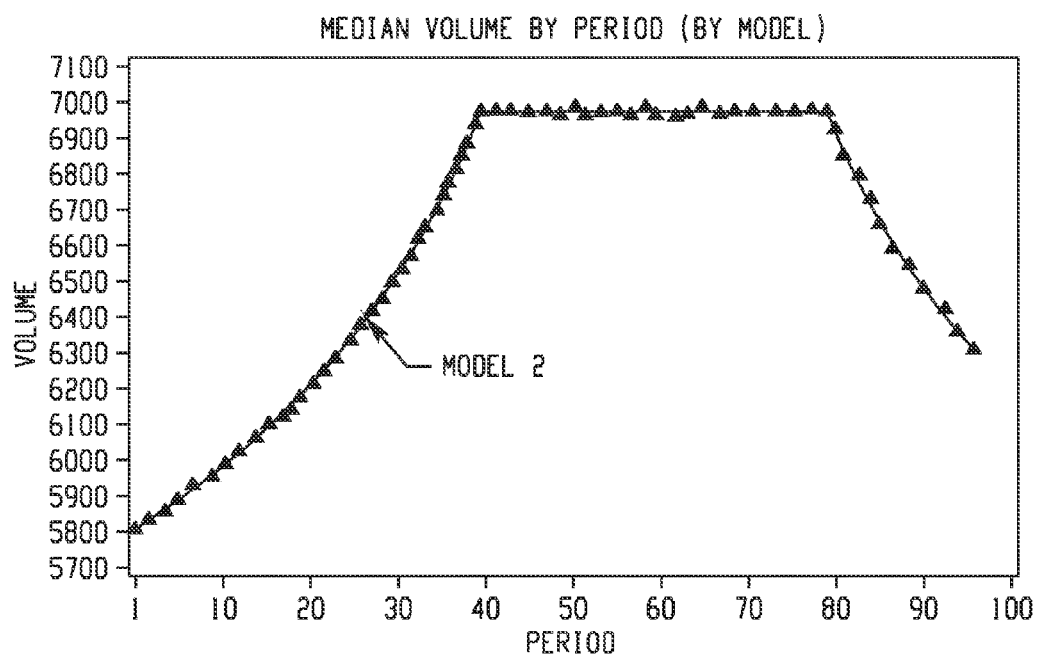
Figure 5D:
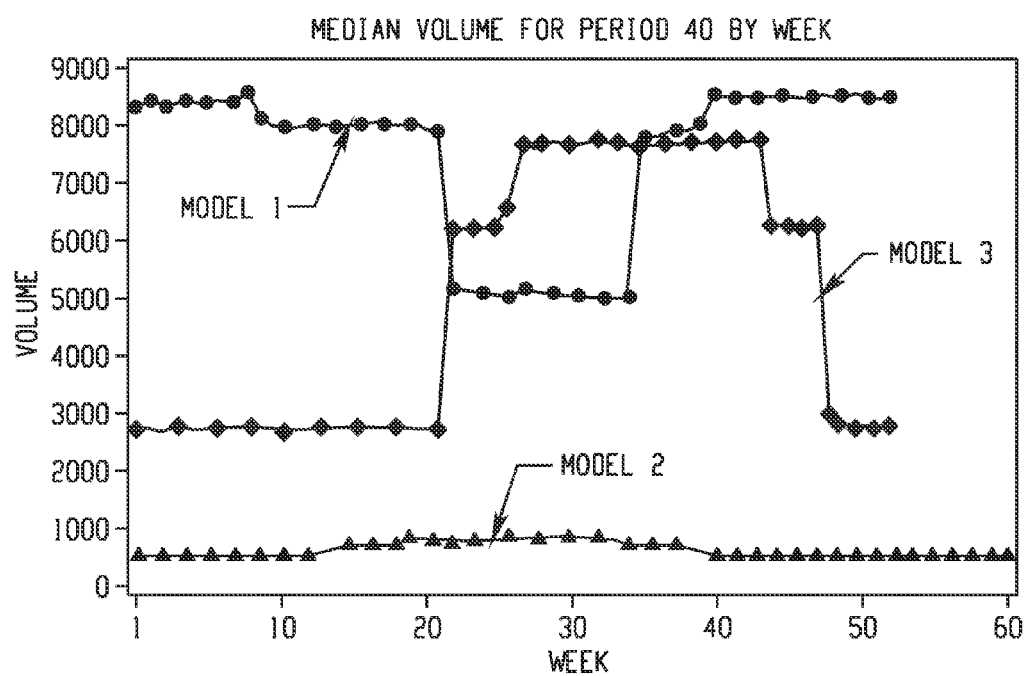

As shown in FIG. 5A, the three data models have similar trends and volume cycles, when the rotation metrics (e.g., volume) are aggregated by year. The difference between these models becomes more evident, when the aggregate data by month (FIG. 5B) or by week (FIG. 5D) are compared. For a same model (e.g., Model 2), data aggregated by different periods show different trends and volume cycles, as shown in FIG. 5D. Therefore, the granularity of the aggregation may be taken into consideration for intelligent rotation between the data models during simultaneous processing.

Table 2 includes a set of rotation factors calculated based on the metrics data.

| Factor Name | Description | Weight Range | Factor Calculation | Metrics Data |
| --- | --- | --- | --- | --- |
| Priority | The priority of the model on the MEC. Each model can have its own table with a defined priority for each time segment. | 0-1 | A vector priority by time period for each model. | Weighted Period Input |
| Overall Historical Demand | The historical demand regardless of period. | 0-1 | Aggregate of overall historical demand by time. | Overall Historical Aggregate |

-continued

| Factor Name | Description | Weight Range | Factor Calculation | Metrics Data |
|---|---|---|---|---|
| Historical Demand for period | The historical demand associated with each model. It is derived from the number of MEC requests that timed-out due to lack of demand over the total number of MEC requests. | 0-1 | Aggregate of overall historical demand by time per period. | Historical Aggregate by Period |
| Current Demand | Same as historical demand, but based on the recent MEC transactions. (real time) | 0-1 | $1 - \left(\frac{\text{\# of Timeouts}}{\text{Total Requests}}\right)$ | Recent MEC History |
| Overall Historical Trend | The historical trend regardless of period. | 0-1 | Regress historical period volume against time to determine trend. OR Take the Delta of Ys and Xs | Overall Historical Aggregate |
| Historical Demand Trend for Period | Trend of the specific day and time period over history. | 0-1 | Regress historical period volume against time (by period) to determine trend. OR Take the Delta of Ys(Demand) and Xs(periods) | Historical Aggregate by Period |
| Current Demand Trend | Real time Trend that has been exhibited during the previous periods in the MEC. | 0-1 | Regress current demand against the previous MEC periods OR take the Delta of Ys and Xs | Recent MEC History |
| Model Complexity * (No time sensitivity) | The complexity of the model. | 0-1 | Complexity is derived from the average run time of the model on a MEC, but can be initially seeded. | Time Insensitive Input |

Figure 6:
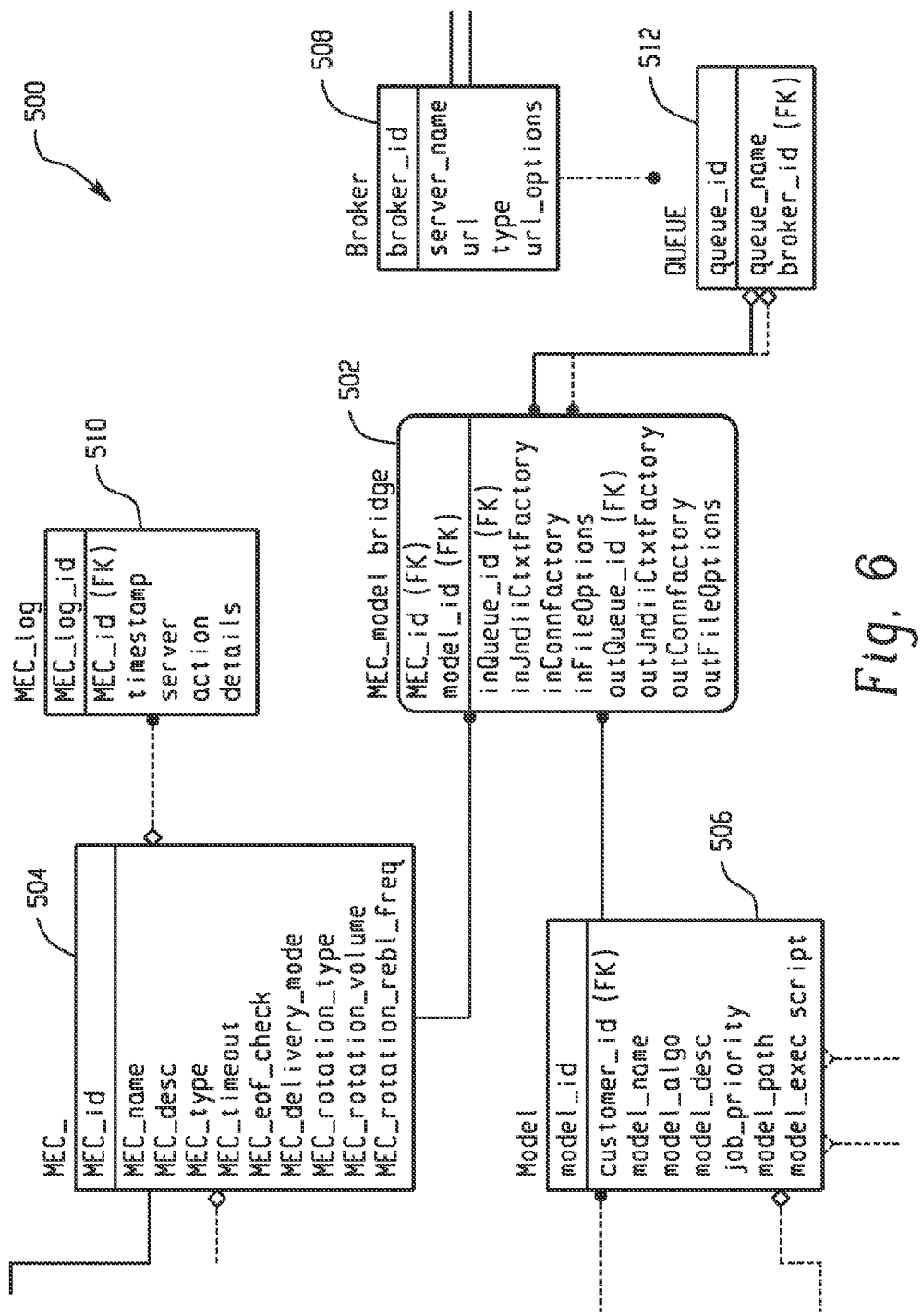
FIG. 6 depicts an example metadata model of a shared MEC and one or more data models.

The rotation factors in Table 2, and/or any additional rotation factors may be used in a metadata model. FIG. 6 depicts an example metadata model of a shared MEC and one or more data models. As shown in FIG. 6, the metadata model 500 includes a table "MEC_model_bridge" 502 that associates a table "MEC" 504 with a table "Model" 506.

The table "MEC" 504 includes a data field "MEC_Rotation_Type" which represents types of allowed rotations based on weighted scoring of the rotation factors, such as priority based on a proportion value calculated by aggregating and normalizing across all weight factors and data models, a highest to lowest (H2L) proportion value, a lowest to highest (L2H) proportion value, or a Bulk Round Robin algorithm. In addition, the table "MEC" 504 includes a data field "MEC_Rotation_Volume" which represents the volume of overall transactions that constitutes a single rotation, and another data field "MEC_Rotation_Rebl_Freq" which represents the frequency of rotations after which the updated current and historical rotation factors may be used to rebalance the rotation across the data models.

In order to determine the rotation factors (e.g., as listed in Table 2), underlying metrics data may need to be computed in line and in real time. Historical information is aggregated into a time aggregate matrix that can be easily loaded into memory as a hash object or an in-memory table. Table 3 includes an example of such a time aggregate matrix.

TABLE 3

| | Metric | Class | Class Type | Model id | Period | AGG | Value |
|---|---|---|---|---|---|---|---|
| 1 | Volume | 0 | Week | 1 | All | Median | 83918.361 |
| 2 | Volume | 0 | Week | 1 | All | Sum | 48589320.835 |
| 3 | Volume | 0 | Week | 1 | All | Mean | 84356.460 |
| 4 | Volume | 0 | Week | 1 | All | Std | 4998.593 |
| 5 | Volume | 0 | Week | 1 | _1 | Median | 94590.854 |

TABLE 3-continued

| | Metric | Class | Class Type | Model id | Period | AGG | Value |
|---|---|---|---|---|---|---|---|
| 6 | Volume | 0 | Week | 1 | _1 | Sum | 565318.759 |
| 7 | Volume | 0 | Week | 1 | _1 | Mean | 94219.793 |
| 8 | Volume | 0 | Week | 1 | _1 | Std | 1688.824 |
| 9 | Volume | 0 | Week | 1 | _10 | Median | 92092.107 |

Table 4 includes a description of the fields of Table 3.

TABLE 4

| Field Name | Field Description |
|---|---|
| Metric | The metric that was aggregated (volume, demand, etc.) |
| Class Type | The type of date/time classification associated with the record. Valid Values: YEAR, QUARTER, MONTH, WEEK, DAY |
| Class | Based on Class type. If the Class_type is Week, then the Class is the actual week associated with the record. If the Class_type is year then the Class might be 2012 or 2011 . . . |
| Model_id | Unique identifier of the model the metric and aggregation is associated to. |
| Period | This can be 'ALL' or a specific period number. This field allow overall historical aggregates and history by period aggregates to be stored in the same table. |
| Agg | The type of aggregation that occurred (MEDIAN, SUM, MEAN, Standard Deviation) |
| Value | The value for the metric, aggregation, and associated time period. |

A combination of the MEC and a data model assigned to the MEC corresponds to a particular input queue and a particular output queue, so that the input data and the execution results related to the combination go into the appropriate input queue and output queue respectively. The table "MEC_model_bridge" 502 includes information related to the input queue (e.g., "inQueue_id (FK)") and the output queue ("outQueue_id (FK)"). In addition, a table "Broker" 508 is for a message broker that separates different customers.

Figure 7:
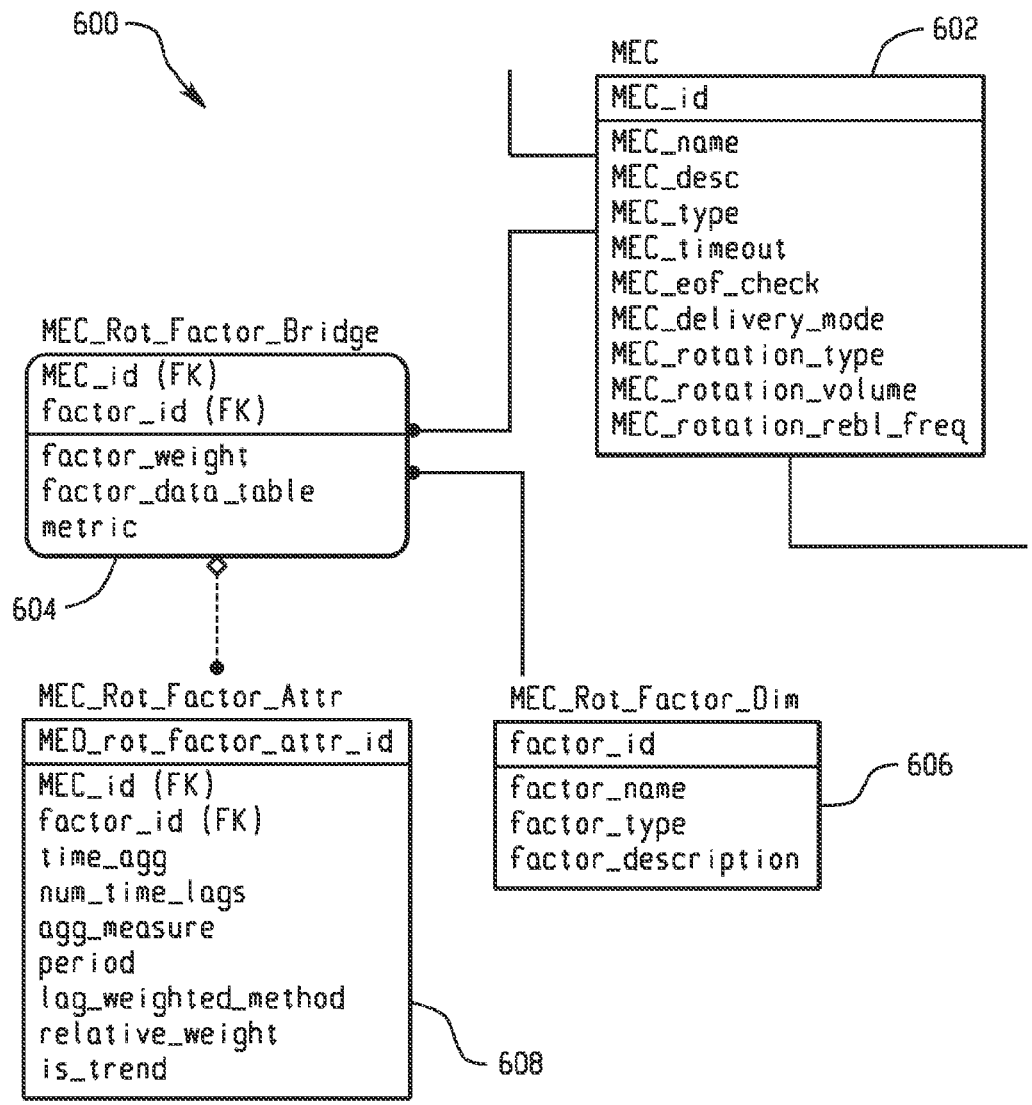
FIG. 7 depicts an example metadata model for a shared MEC.

FIG. 7 depicts an example metadata model for a shared MEC. As shown in FIG. 7, the metadata model 600 includes a table "MEC_Rot_Factor_Dim" 606 representing a dimension that contains rotation factors available to the MEC, a table "MEC_Rot_Factor_Bridge" 604 that associates the MEC to one or more rotation factors, and a table "MEC_Rot_Factor_Attr" 608 which defines the different aggregates and details specific to a combination of a rotation factor and the MEC.

The table "MEC_Rot_Factor_Dim" 606 includes a number of data fields as listed in Table 5. One or more of the rotation factors listed in Table 2 and/or any additional rotation factors may be identified in Table 5.

| Field Name | Field Description | Example Values |
| --- | --- | --- |
| Factor_id | The unique id associated with the rotation factor | 1, 2, 3 . . . n |
| Factor_name | The name of the factor. | |
| Factor_type | The type of factor. | CURRENT, HISTORICAL, NONTIME, WEIGHTED_PERIOD |
| Factor_description | A general description of the factor. | |

The table "MEC_Rot_Factor_Bridge" 604 contains a plurality of data fields as listed in Table 6.

TABLE 6

| Field Name | Field Description | Example Values |
| --- | --- | --- |
| MEC_ID | MEC associated with the record. | Foreign key to the MEC associated with the record. |
| Factor_id | The unique id associated with the rotation factor | Foreign key to the factor associated with the record. |
| Factor_weight | The weight associated to the factor of this record relative to the other factors associated to the MEC. | .8, .5, 1, 0 |
| Factor_data_table | The location of the data (in the defined RTIM standard format) to support the factor (not used for current/real-time factors). The MEC will load this data into memory during initialization and/or reset. | <Blank> (for current metrics), myLib.historical_volume_matrix |
| metric | The metric in the factor_data_table that is used to rotate MECs. | Volume Trend Priority |

The MEC can have its own set of rotation factors based on the types of data models that are assigned to the MEC. For example, the MEC that supports highly volatile data models might contain higher weights for current factors and less or no weight for historical factors.

In addition, the table "MEC_Rot_Factor_Attr" includes data fields as shown in Table 7. A combination of a single rotation factor and the MEC can have multiple attributes, and an attribute has its own relative weight. For example, the Overall Historical Trend factor for the MEC may be based on a dampened/weighted trend of Median values by Quarter and Month.

TABLE 7

| Field Name | Field Description | Example Values |
| --- | --- | --- |
| MEC_rot_factor_attr_id | Unique identifier | |
| MEC_ID | MEC associated with the record. | Foreign key to the MEC associated with the record. |
| Factor_id | The unique id associated with the rotation factor | Foreign key to the factor associated with the record. |
| Time_agg | The time aggregation associated with the attribute of the factor/MEC combination. | <Blank>, YEAR, QUARTER, MONTH, WEEK, DAY |
| Num_time_lags | The number of time periods to lag | 0, 1, 2, 3 . . . <depends on time_agg and available history> |
| Agg_measure | The aggregate measure to reference for the attribute of the factor/MEC. | <Blank>, MEAN, MEDIAN, SUM, STD |
| period | Whether or not to use the aggregate by period for this factor. Note: This allows a factor to use a combination of attributes by period and attributes aggregated overall. | TRUE, FALSE Note: Default periods are 0-95 |
| Lag_weighted_method | How to weight lagged periods for the attribute. | EQUAL, EXPONENTIAL (BASE), LINEAR Note: Default Exponential Base is 2 |
| Relative_weight | The weight of the attribute relative to other attributes of the factor and MEC. | .8, .5, 1, 0 |
| Is_trend | Identifies if this is a trend factor and differencing (and size of differences) needs t occur. | 0, 1, 2, <depends on time_agg and available history and num of time lags). |

For example, considering a MEC assigned to j (j is an integer) different data models. The rotation factors are assigned as shown in Table 8.

TABLE 8

| Factor name | Factor weight | Attribute(s) | Attribute weight | Attribute weighting method |
|---|---|---|---|---|
| Factor 1 | Overall Historical Trend | 0.3 | 1 Quarter lag (of Medians) | 0.45 | Exponential |
| | | | 7 week lag (of Sums) | 0.25 | Linear |
| | | | 5 day lag (of Means) | 0.3 | Equal |
| Factor 2 | Historical Demand for Period | 0.25 | 2 Month Lag (of MEANs) | 0.4 | Linear |
| | | | 3 Day Lag (of STD) | 0.6 | Exponential |
| Factor 3 | Priority | 0.45 | 4 period lag (of priority by period) | 1 | Linear |
| ... | | | | | |
| Factor N | | | | | |

As shown in Table 8, three different attribute weight methods, e.g., an equal-weight method, a linear-lag weighting method, and an exponential weighting method, are applied to different factors for weighting lagged periods which allows more value/emphasis of factor calculations to be placed on more recent values and less value/emphasis on lagged periods that are less recent.

The equal-weight method applies equal weight to each lag (by time aggregate (YEAR, QUARTER, etc.)) based on the number of time lags (n). For example, when n is defined as being equal to num_time_lags+1, then the equal-weight function can be determined as follows:

$$\sum_{i=1}^{n} \left[ \frac{1}{n} X_{t-(i-1)} \right] \quad (1)$$

if num_of_lags=2 (n=3), the equal-weight function is determined as follows:

$$\frac{1}{3} X_t + \frac{1}{3} X_{t-1} + \frac{1}{3} X_{t-2} \quad (2)$$

The linear-lag weighting method applies more weight to most recent values and less to values lag in the past. The linear-lag weighting function can be determined as follows:

$$\sum_{i=-n}^{-1} \left[ \frac{|i|}{\left( n \times \frac{(n+1)}{2} \right)} X_{t-(i+n)} \right] \quad (3)$$

if num_of_lags=2 (n=3), the linear-lag weighting function is determined to be:

$$\frac{|-3|}{\left( 3 \times \frac{(3+1)}{2} \right)} X_{t-(-3+3)} + \frac{|-2|}{\left( 3 \times \frac{(3+1)}{2} \right)} X_{t-(-2+3)} \times \frac{(3+1)}{2} + \frac{|-1|}{\left( 3 \times \frac{(3+1)}{2} \right)} X_{t-(-1+3)} \times \frac{(3+1)}{2} \quad (4)$$

That is:

$$\left( \frac{3}{6} \times X_t \right) + \left( \frac{2}{6} \times X_{t-1} \right) + \left( \frac{1}{6} \times X_{t-2} \right) \quad (5)$$

Assume $X_t$ is the value of the current time or period within time series data. Also, assume that there are three time series values ordered recent to past (200, 600, 400). Applying the linear-lag weight function, $$(0.5 \times 200) + (0.333 \times 600) + (0.1666) \times 400 = 100 + 200 + 66 = 366 \quad (6)$$

The true mean is (200+600+400)/3=400.

The exponential-weighting method applies more weight to most recent values and less to values lag in the past exponentially. The exponential-weighting function is determined as follows:

$$\sum_{i=1}^{n} \left[ \frac{\frac{1}{B^{i-1}}}{\left( \frac{\left( 1 - \left( \frac{1}{B^n} \right) \right)}{1 - \frac{1}{B}} \right)} X_{t-(i-1)} \right] \quad (7)$$

if num_of_lags=2 (n=3), and B=2, the exponential-weighting function is determined to be:

$$\left( \frac{\frac{1}{2^0}}{1.75} \times X_t \right) + \left( \frac{\frac{1}{2^1}}{1.75} \times X_{t-1} \right) + \left( \frac{\frac{1}{2^2}}{1.75} \times X_{t-2} \right) = \quad (8)$$
$$0.57 \times X_t + 0.286 \times X_{t-1} + 0.143 \times X_{t-2}$$

Figure 8A:
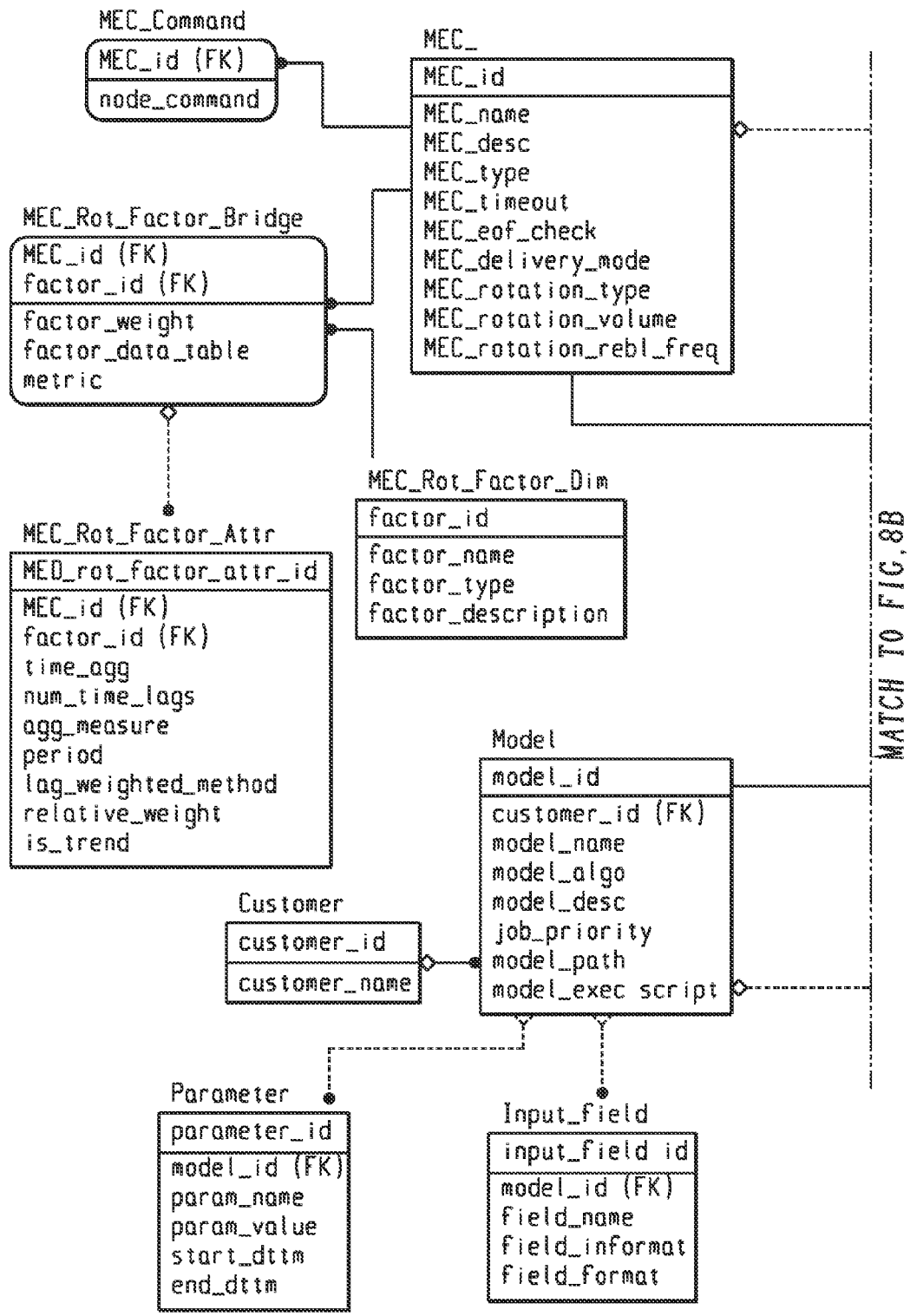
FIGS. 8A and 8B depict another example metadata model of a share MEC and one or more data models.
Figure 8B:
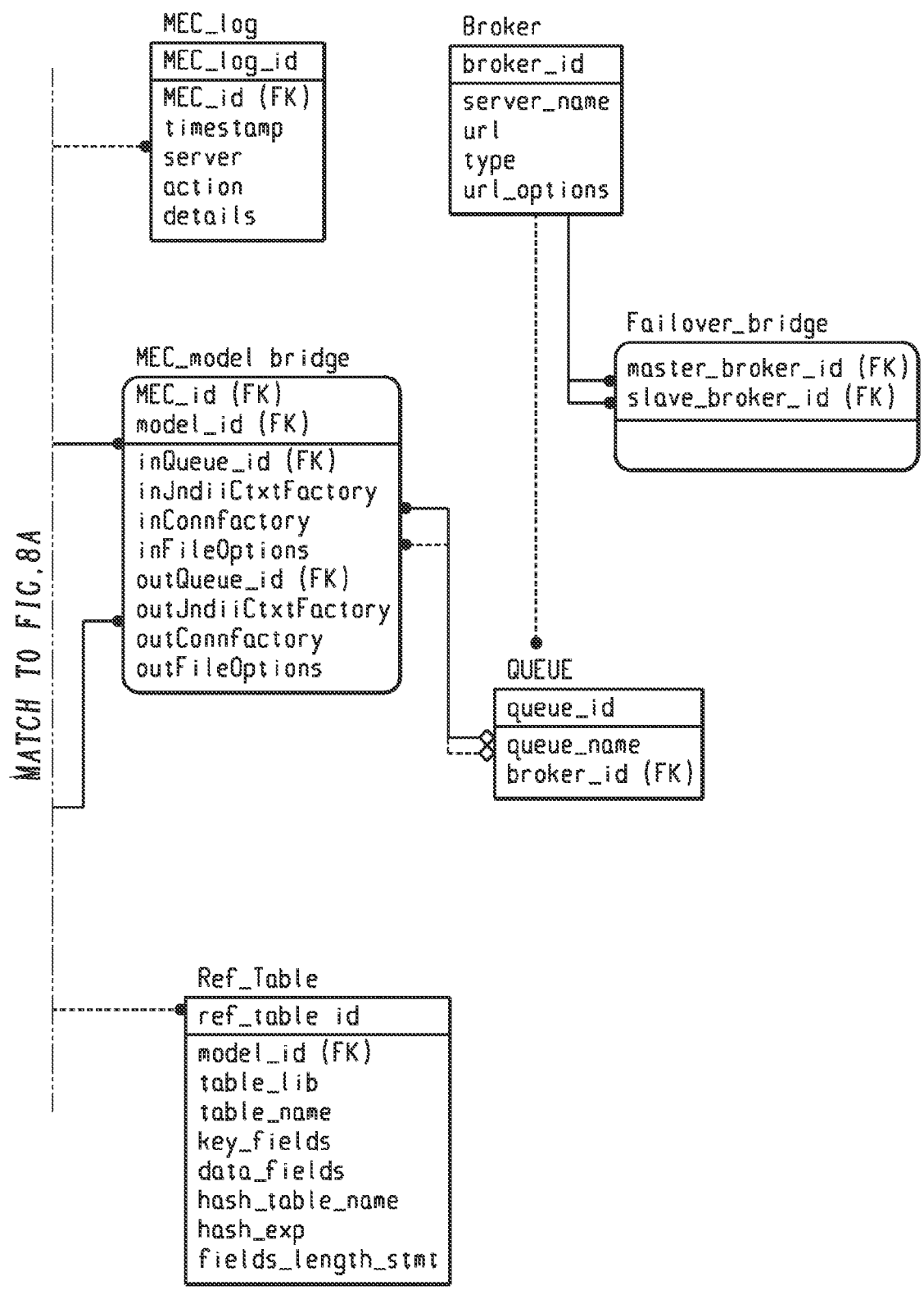

FIGS. 8A and 8B depict another example metadata model of a shared MEC and one or more data models. As shown in FIGS. 8A and 8B, the metadata model includes the tables shown in FIG. 6 and FIG. 7, and further includes tables "MEC_Command," "Customer," "Parameter," "Input_field," "Ref_Table," and "Failover_bridge."

Figure 9:
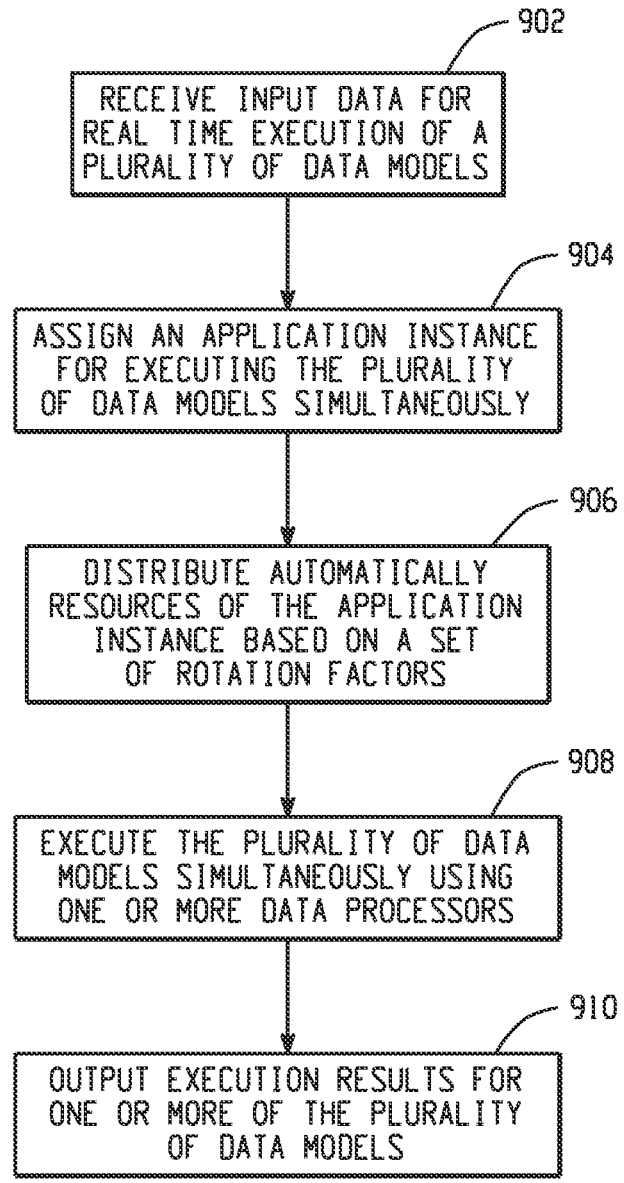
FIG. 9 depicts an example flow chart for real time execution of data models.

FIG. 9 depicts an example flow chart for real time execution of data models. At 902, input data are received for real time execution of a plurality of data models. At 904, an application instance is assigned for executing the plurality of data models simultaneously. At 906, resources of the application instance are automatically distributed based on a set of rotation factors. At 908, the plurality of data models are executed simultaneously using one or more data processors. Execution results for one or more of the plurality of data models are output, at 910.

Figure 10:
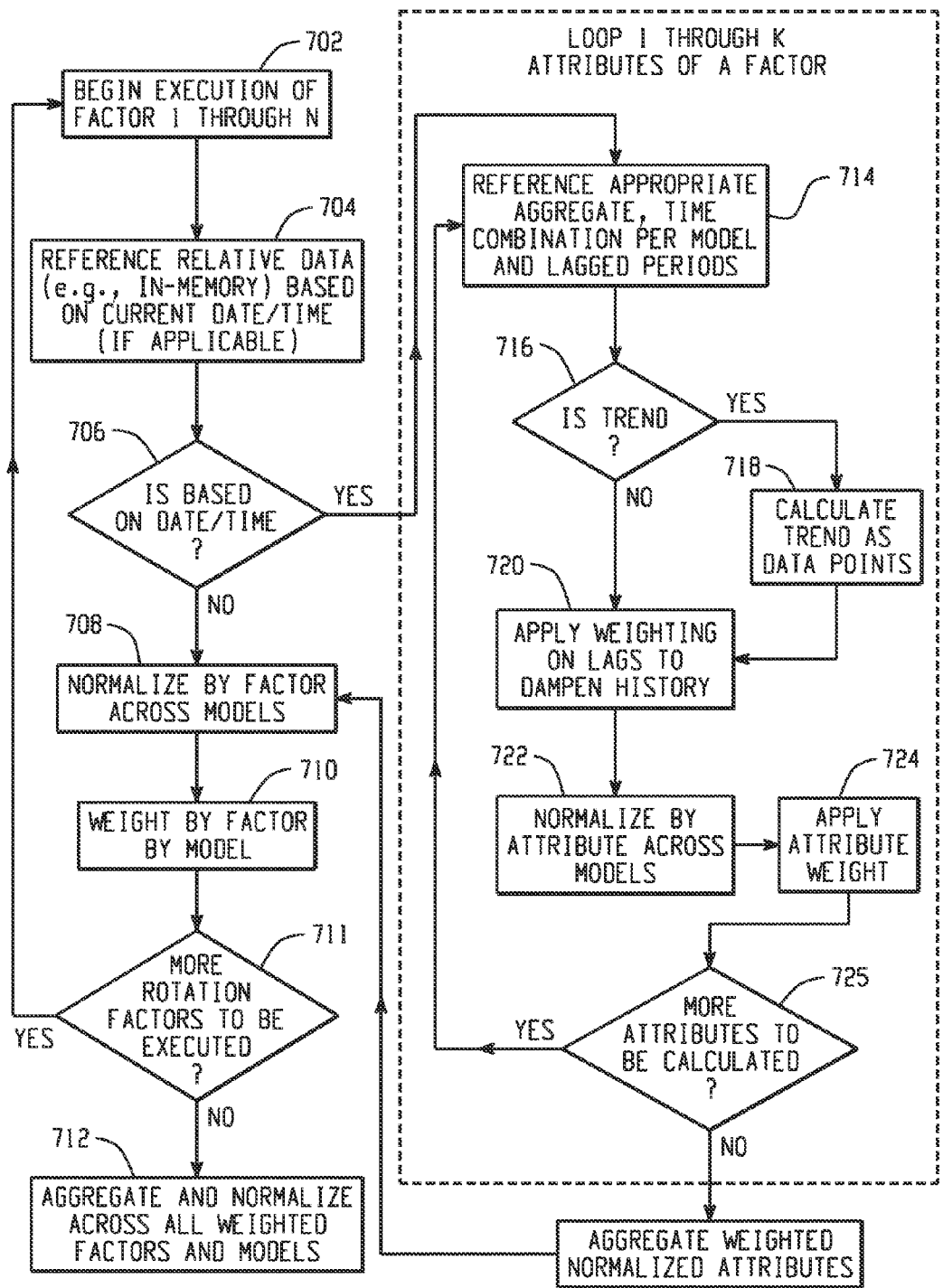
FIG. 10 depicts an example flow chart for calculating normalized and weighted values of rotation factors for multiple data models assigned to a shared MEC.

FIG. 10 depicts an example flow chart for calculating normalized and weighted values of rotation factors for multiple data models assigned to a shared MEC. As shown in FIG. 10, from 702 to 710, the rotation factors are executed consecutively. Then, at 712, aggregation and normalization are performed across all executed rotation factors for multiple data models to generate normalized and weighted values of rotation factors for the data models as a basis for distributing resources of the MEC to the data models.

Specifically, at 704, relevant data of a particular rotation factor are referenced (e.g., in memory). At 706, a determination is made on whether a rotation factor is based on date/time. If a rotation factor is not based on date/time, at 708, values of the rotation factor are generated for the data models, and a normalization based on the generated values of the rotation factor is performed across the data models. Then, at 710, for each data model, a weight is applied to the normalized rotation factor. If a rotation factor is based on date/time, from 714 to 724, a number of attributes of the rotation factor (e.g., metrics data) are calculated, normalized, and weighted. At 726, the weighted normalized attributes are aggregated.

Then, at 708, values of the rotation factor are generated and normalized for the data models, and at 710, for each data model, a weight is applied to the normalized rotation factor. At 711, a determination as to whether any more rotation factors need to be executed is carried out. If the rotation factor is the last one to be calculated, then, at 712, the normalized and weighted values of rotation factors for the data models are generated. Otherwise, a next rotation factor is to be calculated.

Particularly, if a rotation factor is based on date/time, at 714, an appropriate combination of aggregate and time and lagged periods are referenced (e.g., in memory) for calculating an attribute of the rotation factor. At 716, a determination on whether there is a trend in the referenced data is made. If a trend is detected, at 718, such a trend is calculated as data points. At 720, a weighting method (e.g., a linear-lag weighting method, an exponential-weighting method) is applied on lags to dampen history. At 722, values of the attribute are generated and normalized across the data models. At 724, an attribute weight is applied to the normalized attribute. At 725, it is determined whether any more attributes of the rotation factor need to be calculated. If the attribute is the last one to be calculated, then, at 726, the weighted normalized attributes are aggregated for calculating the associated rotation factor. Otherwise, a next attribute of the rotation factor is to be calculated.

Figure 11:
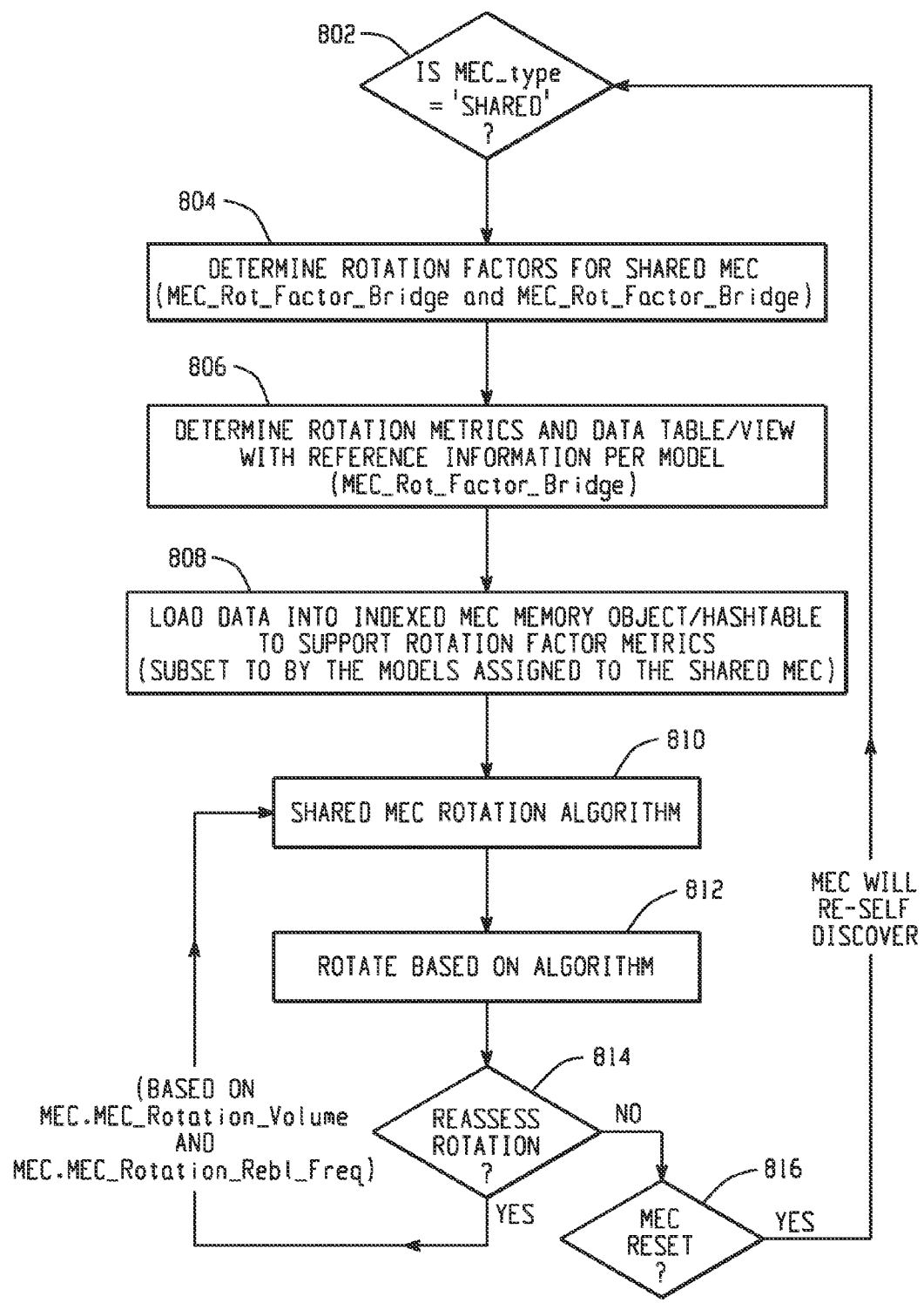
FIG. 11 depicts an example flow chart for initializing/resetting a shared MEC.

FIG. 11 depicts an example flow chart for initializing/resetting a shared MEC. As shown in FIG. 11, the initialization/resetting process of the shared MEC is a self-discovery process. Rotation factors and relevant data are determined for a shared MEC, and based on the determined rotation factors, the shared MEC rotates workload for executing multiple data models. After a certain number of rotations, the share MEC may reset and start all over again.

At 802, whether the MEC is assigned to multiple data models is determined. If the MEC is not shared by multiple data models, no rotation is executed. If the MEC is shared by multiple data models, at 804, rotation factors are determined. For example, the table "MEC_Rot_Factor_Bridge" (e.g., as shown in FIG. 7) may be obtained. At 806, rotation metrics and data table/view with reference information of each data model may be determined. Then, at 808, data are loaded into an indexed MEC memory object/hash-table to support rotation factor metrics. At 810, a shared MEC rotation algorithm is executed to determine values of the rotation factors, e.g., as shown in FIG. 10. At 812, the shared MEC rotates workload among the data models based on the determined values for the data models. At 814, a determination is made on whether the rotation should be reassessed, after a certain number of rotations. For example, the data fields "MEC_Rotation_Volume" and "MEC_Rotation_Rebl_Freq") may be used for the determination. If it is determined that the rotation should be reassessed, at 810, the shared MEC rotation algorithm is executed again. If it is determined that the MEC needs to be reset, the MEC resets and goes through the self-discovery process again.

Figure 12:
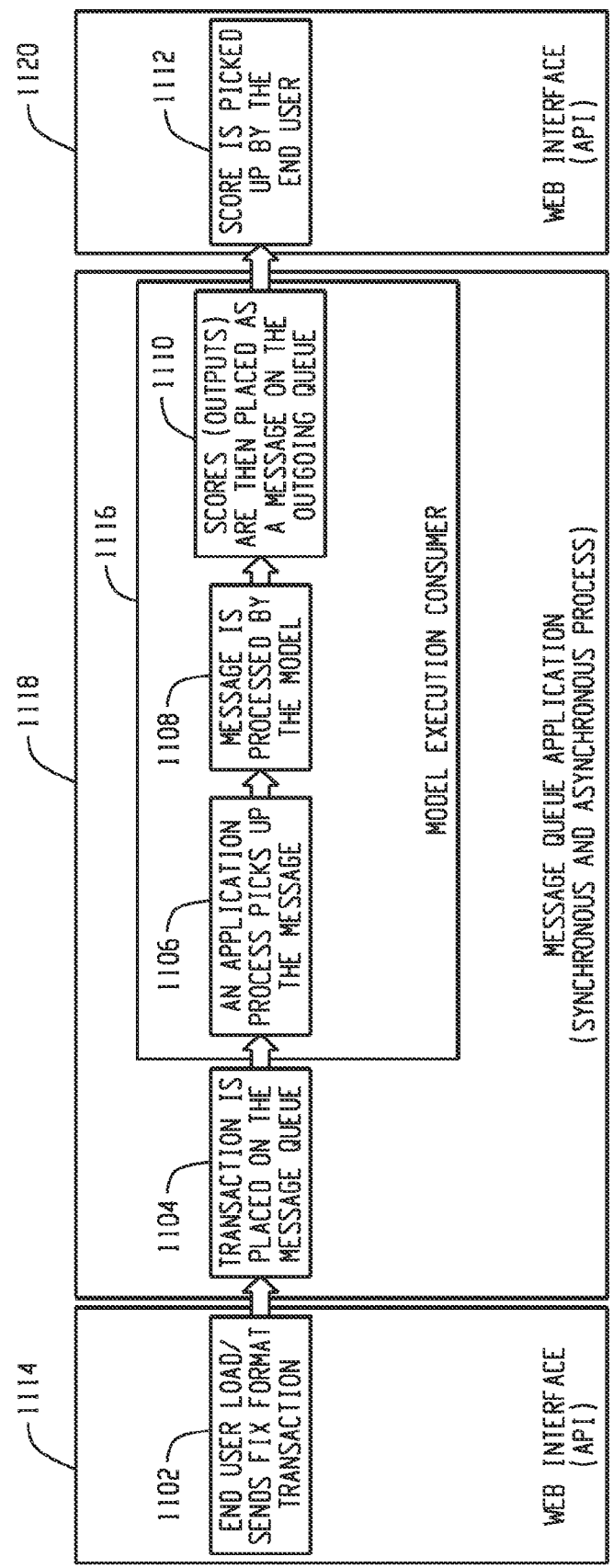
FIG. 12 depicts an example flow diagram for a customer's interaction with a computer environment where a multi-tenant system is used for real time execution of data models.

FIG. 12 depicts an example flow diagram for a customer's interaction with a computer environment where a multi-tenant system is used for real time execution of data models. As shown in FIG. 12, a customer sends transactions to and receives results from a message queue application 1118 (e.g., within a multi-tenant system). A model execution consumer 1116 is assigned to the customer for processing the transaction.

Specifically, at 1102, the customer sends a transaction to the message queue application 1118 through a web interface 1114. At 1104, the transaction is placed on a message queue. At 1106, an application process picks up the message associated with the transaction. At 1108, an existing data model is executed to process the message. Then, at 1110, scores (e.g., outputs) are placed as a message on an outgoing queue. At 1112, the customer picks up the scores through a web interface 1120.

Figure 13:
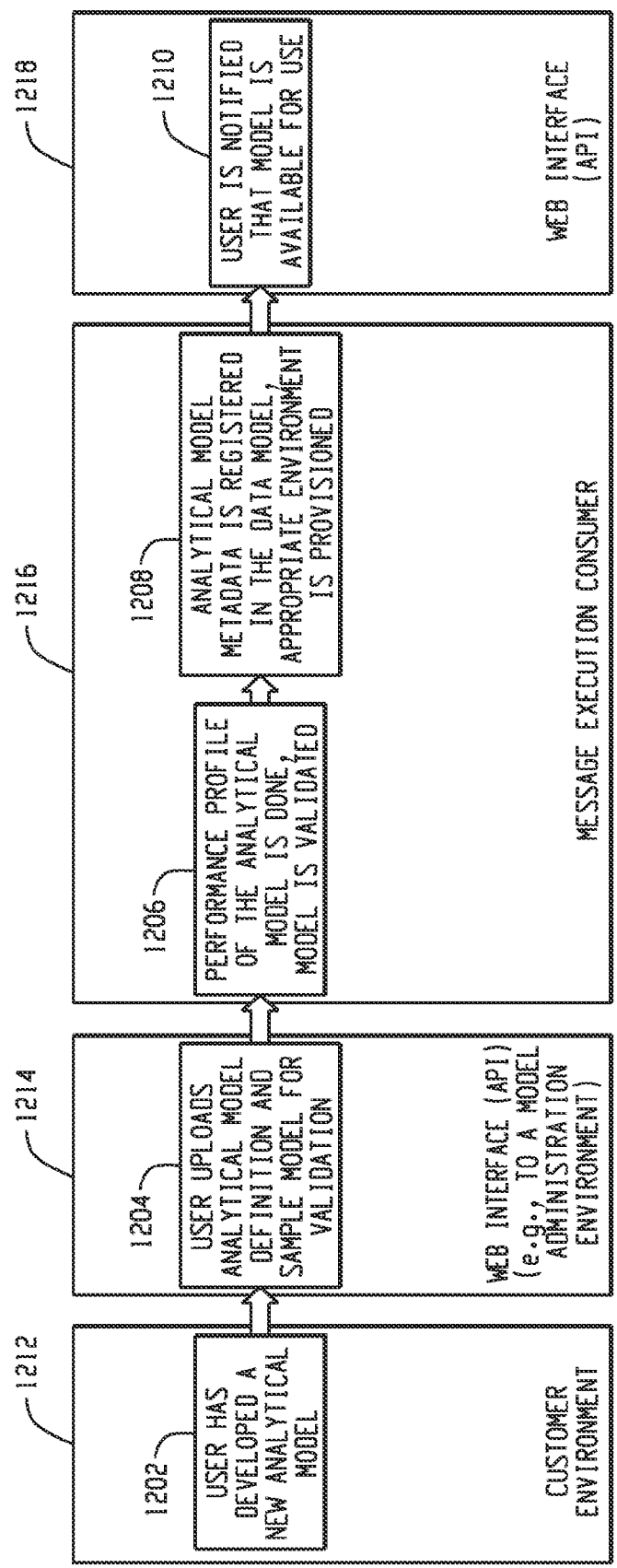
FIG. 13 depicts another example flow diagram for a customer's interaction with a computer environment where a multi-tenant system is used for real time execution of data models.

FIG. 13 depicts another example flow diagram for a customer's interaction with a computer environment where a multi-tenant system is used for real time execution of data models. As shown in FIG. 13, a customer uploads a newly developed data model to a message execution consumer 1216 (e.g., within a multi-tenant system) which processes the uploaded data model to make the model available for future use.

At 1202, the customer develops a new analytical model in a customer environment 1212. Then, at 1204, the customer uploads the definition and sample data of the newly developed model to the message execution consumer 1216 for validation through a web interface 1214 (e.g., to a model administration environment). At 1206, the message execution consumer 1216 obtains performance profile of the newly uploaded model and validates the model. Then, at 1208, metadata is registered for the newly uploaded model, and appropriate environment is provisioned for the model. Finally, at 1210, the customer receives a notice through a web interface 1218 that the model is available for future use.

Figure 14:
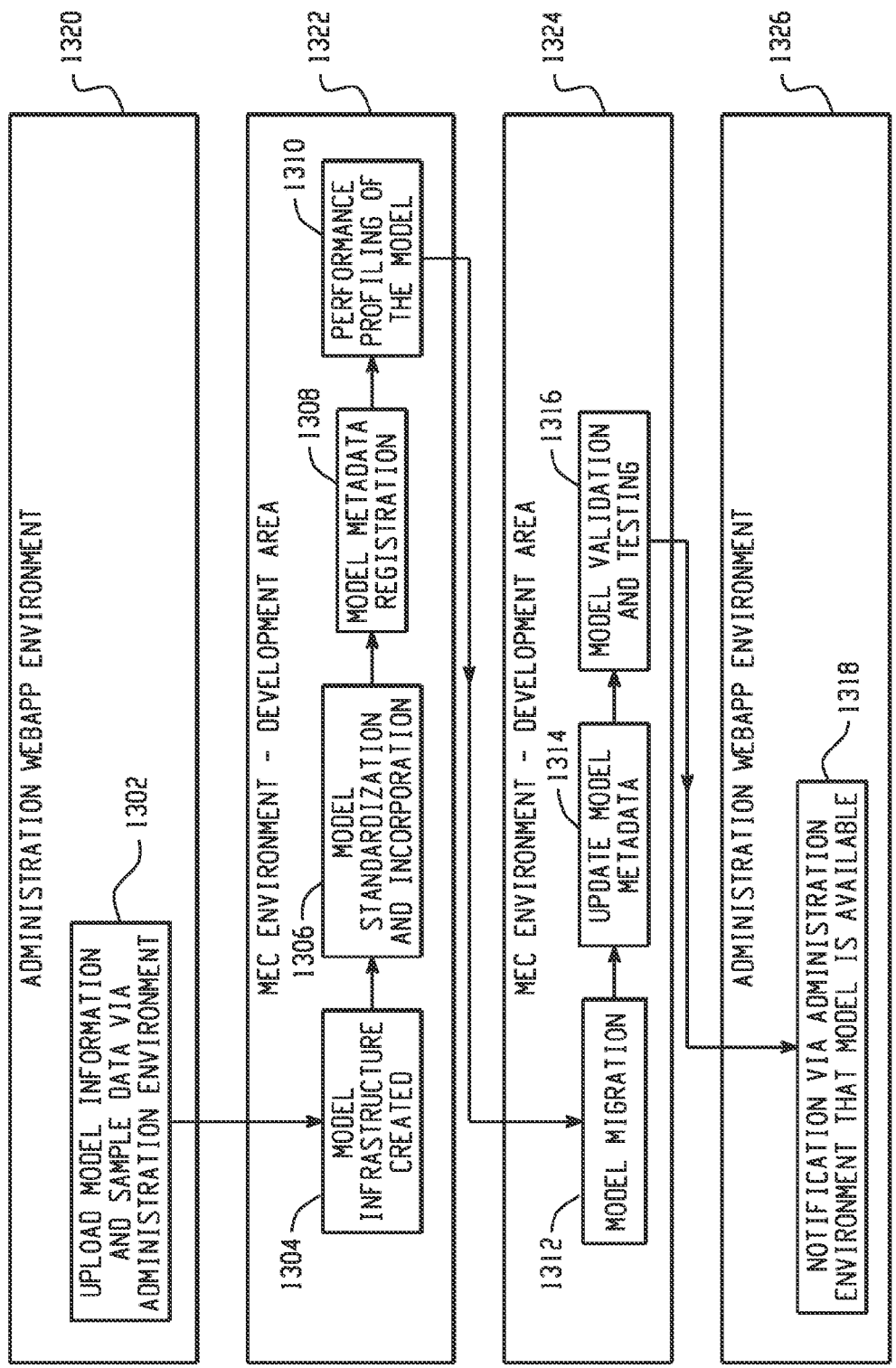
FIG. 14 depicts an example computer environment where a new model is processed. A new model uploaded by a customer goes through several processes before becoming available for use.
Figure 18:
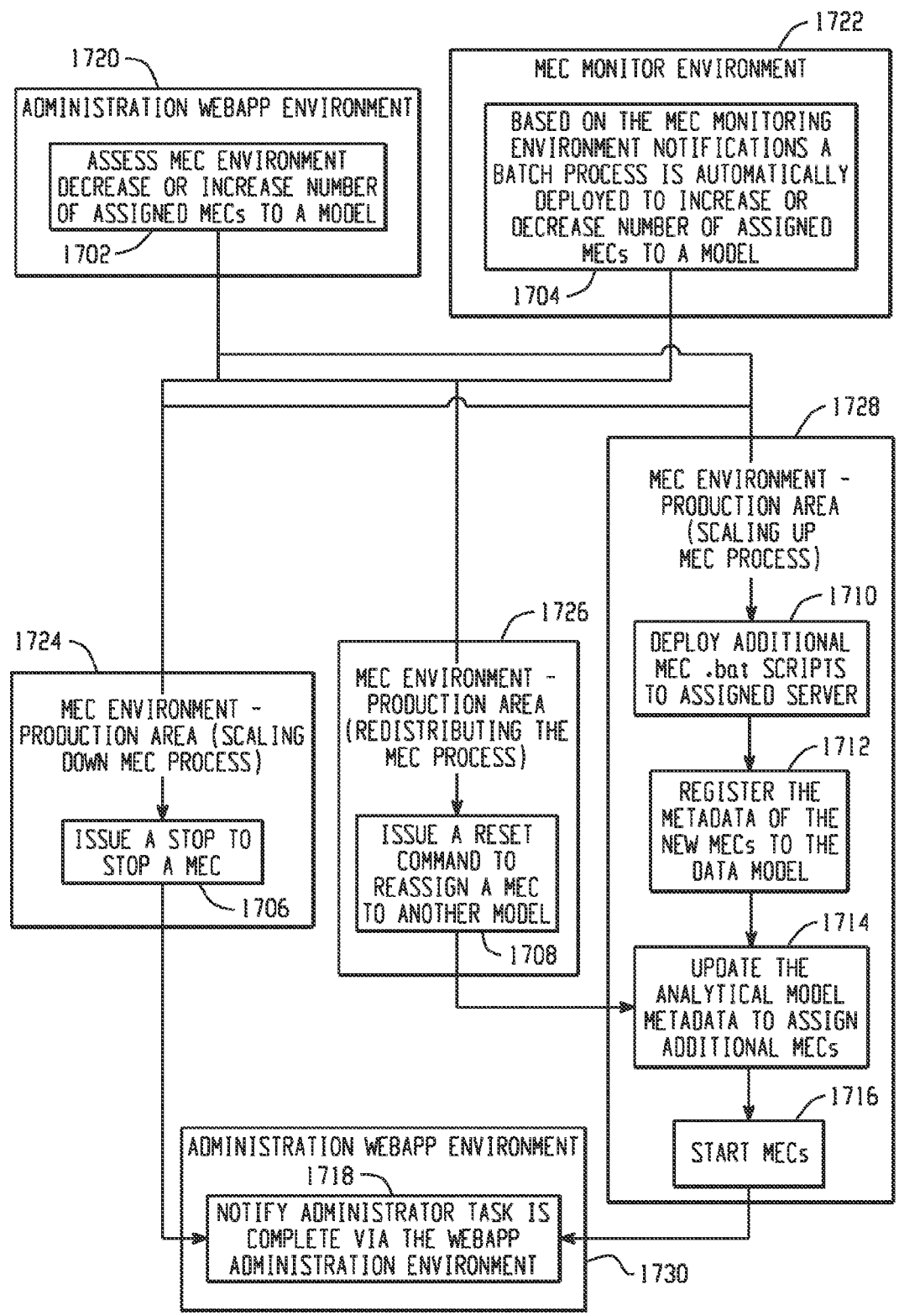
FIG. 18 depicts an example flow diagram for changing the number of MECs assigned to a data model.

FIG. 14 depicts an example computer environment where a new model is processed. A new model uploaded by a customer goes through several processes before becoming available for use. As shown in FIG. 14, at 1302, model information and sample data of the new model are uploaded via an administration web-application environment 1320. Then, in a message-execution-consumer environment 1322, at 1304, a model infrastructure, including relevant file location, is created to support the newly uploaded model.

At 1306, the new model goes through a standardization process and is incorporated in a program to be called and executed on a message execution consumer when needed. For example, if the new model is a linear scoring model, a macro may be generated after the standardization and incorporation process as follows:

```
%macro NCAA_Win_Pct( );
   format y_hat 5.2 outputMsg $48.;
   y_hat= -116.80204
      + (FG_Pct * 2.88250)
      + (asst * 0.37290)
      + (turnOvers * -3.51317)
      + (Three_FG_Pct * 0.30157)
      + (Free_th_made * 1.39209)
      + (reb_total * 1.92967)
      + (pers_fouls * -0.57827);
   root_mse=10.35;
   r_sq=.6816;
   adj_r_sq=.6811;
   AIC=20248;
   outputMsg = teamID || put(y_hat,6.2) || put(root_mse,5.3)    ||
put(r_sq,5.4) || put(adj_r_sq,5.4) ||          put(AIC,5.);
   put outputMsg;
%mend;
```

At 1308, metadata parameters are set and registered for the new model. Then, at 1310, performance profiling of the new model may be carried out. At 1312, model migration may be performed in another message-execution-consumer environment 1324. Then, at 1314, the model metadata may be updated. The model validation and testing may be conducted, at 1316. Eventually, at 1318, a notification may be sent to the customer via an administration web-application environment 1326 to inform the customer that the new model is available for use.

For example, the metadata information of the new model may be added to the table "Model" as shown in FIGS. 8A and 8B, including the code location referenced in the above-described Macro. FIG. 15(*a*) depicts an example showing metadata information for the new model. In addition, the metadata for the relevant inputs parameters needed for the new model may be added to the table "Input_field" as shown in FIGS. 8A and 8B. FIG. 15(*b*) depicts an example showing inputs for the new model. Further, the table "Parameter" as shown in FIGS. 8A and 8B may be updated with parameters that can be used by the new model. For example, a parameter may be created to identify how many standard deviations from the mean justifies an anomaly. The customer may change the parameter through the web interface without needing to redeploy the model. FIG. 15(*c*) depicts an example showing parameters for the new model.

Furthermore, the table "MEC_model_bridge" as shown in FIGS. 8A and 8B may be updated to assign the new model to a MEC or multiple MECs for execution. FIG. 16(*a*) depicts an example showing the new model is assigned to MECs. Also, the table "MEC" as shown in FIGS. 8A and 8B may be updated. FIG. 16(*b*) depicts an example showing MECs associated with the new model. In addition, the table "MEC_log" as shown in FIGS. 8A and 8B may be updated as well. FIG. 16(*c*) depicts an example showing log formation for the new model. In another example, a new broker or a new queue may be added to the MEC environment. The table "Broker" or the table "Queue" as shown in FIGS. 8A and 8B may be updated. FIG. 17(*a*) depicts an example showing the broker information with relevant connection parameters, and FIG. 17(*b*) depicts an example showing the queue name and assignment to a broker on which the queue is created.

FIG. 17 depicts an example flow diagram for changing the number of MECs assigned to a data model. As shown in FIG. 17, scaling up, scaling down or redistributing MECs assigned to a data model may be achieved through automatic background processes (e.g., 1702) in a MEC monitor environment 1722, or through manual processes (e.g., 1704) in an administration web-application environment 1720.

Specifically, at 1706, a "STOP" command may be issued in a MEC environment 1724, either through the automatic background processes or the manual processes, to stop one or more MECs assigned to the model to decrease the number of MECs. When the number of MECs assigned to the model needs to be increased, a scaling-up process may be carried out in another MEC environment 1728. For example, at 1710, additional MEC .bat scripts may be first deployed to assigned servers for generating new MECs. At 1712, metadata of the new MECs are registered to the data model. At 1714, metadata of the data model may be updated to assign the new MECs. At 1716, the new MECs assigned to the data model may be started. When MECs assigned to the data model need to be redistributed, a redistribution process may be carried out in a MEC environment 1726. For example, at 1708, a "RESET" command may be issued to reassign one or more MECs to another model. After the change of the MECs assigned to the data model, a notification may be sent via an administration web-application environment 1730, at 1718.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. For example, the actions recited in the claims can be performed in a different order and still achieve desirable results.

It is claimed:

1. A computer-implemented method for rotating real time execution of data models using an application instance, the method comprising:
   receiving input data for real time execution of a plurality of data models;
   assigning an application instance for executing the plurality of data models simultaneously;
   automatically distributing resources of the application instance based on a set of rotation factors;
   executing the plurality of data models simultaneously using one or more data processors; and
   outputting execution results for one or more of the plurality of data models;
   wherein automatically distributing resources of the application instance based on a set of rotation factors comprises:
      determining whether a rotation factor is time-dependent;
      responsive to determining that the rotation factor is time-dependent, calculating an aggregate of one or more rotation attributes of the rotation factor;
      normalizing rotation data associated with the rotation factor across the plurality of data models;
      applying a weight of the rotation factor to the normalized rotation data of each of the plurality of data models;
      aggregating the weighted rotation data of the plurality of data models; and
      normalizing the aggregated weighted rotation data.

2. The method of claim 1, further comprising executing at least one of an initialization or a reset of the application instance, wherein the executing of the initialization or the reset comprises:
   determining the plurality of data models;
   determining the set of rotation factors;
   determining the rotation data associated with the set of rotation factors for the plurality of data models; and
   determining a rotation algorithm for distributing the resources of the application instance for executing the plurality of data models simultaneously.

3. The method of claim 2, and further comprising:
   after a predetermined period of time, recalculating the rotation data based on historical information and current information; and
   adjusting the distribution of resources of the application instance for executing the plurality of data models.

4. The method of claim 1, wherein the weight of the rotation factor is in a range of 0-1.

5. The method of claim 1, wherein the set of rotation factors include a priority for a data model, an overall historical demand, a historical demand for a period, a current demand, an overall historical trend, a historical demand trend for the period, a current demand trend, and a model complexity.

6. The method of claim 1, wherein the application instance includes a data step loop.

7. The method of claim 1, wherein the plurality of data models is associated with one or more input queues and one or more output queues, the input data being received through the input queues, the execution results being output through the output queues.

8. The method of claim 1, further comprising receiving the input data for a data model in response to a web service call.

9. The method of claim 1, further comprising outputting the execution results for the data model through an output queue associated with the data model.

10. A computer-implemented method for rotating real time execution of data models using an application instance, the method comprising:
    receiving input data for real time execution of a plurality of data models;
    assigning an application instance for executing the plurality of data models simultaneously;
    automatically distributing resources of the application instance based on a set of rotation factors;
    executing the plurality of data models simultaneously using one or more data processors; and
    outputting execution results for one or more of the plurality of data models;
    wherein automatically distributing resources of the application instance based on a set of rotation factors comprises:
       determining whether a rotation factor is time-dependent; and
       responsive to determining that the rotation factor is time-dependent,
          determining whether a rotation attribute of a rotation factor is associated with the trend;
          responsive to determining that the rotation attribute is associated with the trend, calculating the trend as part of attribute data associated with the rotation attribute;
          applying a lag weight to the attribute data associated with the rotation attribute;
          normalizing the attribute data associated with the rotation attribute across the plurality of data models; and
          applying an attribute weight to the normalized attribute data.

11. The method of claim 10, wherein the lag weight is applied through a weighting method selected from a group consisting of an equal weight method, a linear lag weighting method, and an exponential weighting method.

12. The method of claim 10, further comprising executing at least one of an initialization or a reset of the application instance, wherein the executing of the initialization or the reset comprises:
    determining the plurality of data models;
    determining the set of rotation factors;
    determining rotation data associated with the set of rotation factors for the plurality of data models; and
    determining a rotation algorithm for distributing the resources of the application instance for executing the plurality of data models simultaneously.

13. The method of claim 12, and further comprising:
    after a predetermined period of time, recalculating the rotation data based on historical information and current information; and
    adjusting the distribution of resources of the application instance for executing the plurality of data models.

14. The method of claim 10, wherein the set of rotation factors include a priority for a data model, an overall historical demand, a historical demand for a period, a current demand, an overall historical trend, a historical demand trend for the period, a current demand trend, and a model complexity.

15. The method of claim 10, wherein the application instance includes a data step loop.

16. The method of claim 10, wherein the plurality of data models is associated with one or more input queues and one or more output queues, the input data being received through the input queues, the execution results being output through the output queues.

17. The method of claim 10, further comprising receiving the input data for a data model in response to a web service call.

18. The method of claim 10, further comprising outputting the execution results for the data model through an output queue associated with the data model.

19. A computer-implemented method for rotating real time execution of data models using an application instance, the method comprising:
receiving input data for real time execution of a plurality of data models;
assigning an application instance for executing the plurality of data models simultaneously;
automatically distributing resources of the application instance based on a set of rotation factors;
executing the plurality of data models simultaneously using one or more data processors;
outputting execution results for one or more of the plurality of data models; and
determining metric data associated with the set of rotation factors for the plurality of data models;
wherein:
the metric data includes an overall historical aggregate, a historical aggregate by period, a recent history of the application instance, a weighted period input, and a time independent input;
the overall historical aggregate includes historical data aggregated across periods over time;
the historical aggregate by period includes the historical data aggregated by a period over time;
the recent history of the application instance includes real-time information aggregated by the application instance;
the weighted period input is received for assigning a weight to a data model by the period; and
the time independent input includes a value for the data model that is time insensitive.

20. The method of claim 19, further comprising executing at least one of an initialization or a reset of the application instance, wherein the executing of the initialization or the reset comprises:
determining the plurality of data models;
determining the set of rotation factors;
determining rotation data associated with the set of rotation factors for the plurality of data models; and
determining a rotation algorithm for distributing the resources of the application instance for executing the plurality of data models simultaneously.

21. The method of claim 20, and further comprising:
after a predetermined period of time, recalculating the rotation data based on historical information and current information; and
adjusting the distribution of resources of the application instance for executing the plurality of data models.

22. The method of claim 19, wherein the set of rotation factors include a priority for a data model, an overall historical demand, a historical demand for a period, a current demand, an overall historical trend, a historical demand trend for the period, a current demand trend, and a model complexity.

23. The method of claim 19, wherein the application instance includes a data step loop.

24. The method of claim 19, wherein the plurality of data models is associated with one or more input queues and one or more output queues, the input data being received through the input queues, the execution results being output through the output queues.

25. The method of claim 19, further comprising receiving the input data for a data model in response to a web service call.

26. The method of claim 19, further comprising outputting the execution results for the data model through an output queue associated with the data model.

27. A computer-implemented system for rotating real time execution of data models using an application instance, said system comprising:
one or more data processors; and
a non-transitory computer-readable storage medium encoded with instructions for commanding the data processors to execute operations including:
receiving input data for real time execution of a plurality of data models;
assigning an application instance for executing the plurality of data models simultaneously;
automatically distributing resources of the application instance based on a set of rotation factors;
executing the plurality of data models simultaneously;
outputting execution results for one or more of the plurality of data models;
determining whether a rotation factor is time-dependent;
responsive to determining that the rotation factor is time-dependent, calculating an aggregate of one or more rotation attributes of the rotation factor;
normalizing rotation data associated with the rotation factor across the plurality of data models;
applying a weight of the rotation factor to the normalized rotation data of each of the plurality of data models;
aggregating the weighted rotation data of the plurality of data models; and
normalizing the aggregated weighted rotation data.

28. The system of claim 27, wherein the instructions are configured to cause the data processors to execute further operations including:
executing at least one of an initialization or a reset of the application instance, wherein the executing of the initialization or the reset comprises:
determining the plurality of data models;
determining the set of rotation factors;
determining the rotation data associated with the set of rotation factors for the plurality of data models; and
determining a rotation algorithm for distributing the resources of the application instance for executing the plurality of data models simultaneously.

29. The system of claim 28, wherein the instructions are configured to cause the data processors to execute further operations including:
after a predetermined period of time, recalculating the rotation data based on historical information and current information; and
adjusting the distribution of resources of the application instance for executing the plurality of data models.

30. A computer-implemented system for rotating real time execution of data models using an application instance, said system comprising:
one or more data processors; and
a non-transitory computer-readable storage medium encoded with instructions for commanding the data processors to execute operations including:
receiving input data for real time execution of a plurality of data models;

assigning an application instance for executing the plurality of data models simultaneously;
automatically distributing resources of the application instance based on a set of rotation factors;
executing the plurality of data models simultaneously;
outputting execution results for one or more of the plurality of data models;
determining whether a rotation factor is time-dependent; and
responsive to determining that the rotation factor is time-dependent,
 determining whether a rotation attribute of a rotation factor is associated with a trend;
 responsive to determining that the rotation attribute is associated with the trend, calculating the trend as part of attribute data associated with the rotation attribute;
 applying a lag weight to the attribute data associated with the rotation attribute;
 normalizing the attribute data associated with the rotation attribute across the plurality of data models; and
 applying an attribute weight to the normalized attribute data.

31. The system of claim 30, wherein the instructions are configured to cause the data processors to execute further operations including:
 executing at least one of an initialization or a reset of the application instance, wherein the executing of the initialization or the reset comprises:
  determining the plurality of data models;
  determining the set of rotation factors;
  determining rotation data associated with the set of rotation factors for the plurality of data models; and
  determining a rotation algorithm for distributing the resources of the application instance for executing the plurality of data models simultaneously.

32. The system of claim 31, wherein the instructions are configured to cause the data processors to execute further operations including:
 after a predetermined period of time, recalculating the rotation data based on historical information and current information; and
 adjusting the distribution of resources of the application instance for executing the plurality of data models.

33. A computer-implemented system for rotating real time execution of data models using an application instance, said system comprising:
 one or more data processors; and
 a non-transitory computer-readable storage medium encoded with instructions for commanding the data processors to execute operations including:
  receiving input data for real time execution of a plurality of data models;
  assigning an application instance for executing the plurality of data models simultaneously;
  automatically distributing resources of the application instance based on a set of rotation factors;
  executing the plurality of data models simultaneously;
  outputting execution results for one or more of the plurality of data models; and
  determining metric data associated with rotation data; wherein:
   the metric data includes an overall historical aggregate, a historical aggregate by period, a recent history of the application instance, a weighted period input, and a time independent input,
   the overall historical aggregate includes historical data aggregated across periods over time,
   the historical aggregate by period includes the historical data aggregated by a period over time,
   the recent history of the application instance includes real-time information aggregated by the application instance,
   the weighted period input is received for assigning a weight to a data model by the period, and
   the time independent input includes a value for the data model that is time insensitive.

34. The system of claim 33, wherein the instructions are configured to cause the data processors to execute further operations including:
 executing at least one of an initialization or a reset of the application instance, wherein the executing of the initialization or the reset comprises:
  determining the plurality of data models;
  determining the set of rotation factors;
  determining the rotation data associated with the set of rotation factors for the plurality of data models; and
  determining a rotation algorithm for distributing the resources of the application instance for executing the plurality of data models simultaneously.

35. The system of claim 34, wherein the instructions are configured to cause the data processors to execute further operations including:
 after a predetermined period of time, recalculating the rotation data based on historical information and current information; and
 adjusting the distribution of resources of the application instance for executing the plurality of data models.

36. A non-transitory computer readable medium comprising programming instructions for rotating real time execution of data models using an application instance, the programming instructions configured to cause a processing system to execute operations comprising:
 receiving input data for real time execution of a plurality of data models;
 assigning an application instance for executing the plurality of data models simultaneously;
 automatically distributing resources of the application instance based on a set of rotation factors;
 executing the plurality of data models simultaneously;
 outputting execution results for one or more of the plurality of data models;
 determining whether a rotation factor is time-dependent;
 responsive to determining that the rotation factor is time-dependent, calculating an aggregate of one or more rotation attributes of the rotation factor;
 normalizing rotation data associated with the rotation factor across the plurality of data models;
 applying a weight of the rotation factor to the normalized rotation data of each of the plurality of data models;
 aggregating the weighted rotation data of the plurality of data models; and
 normalizing the aggregated weighted rotation data.

37. A non-transitory computer readable medium comprising programming instructions for rotating real time execution of data models using an application instance, the programming instructions configured to cause a processing system to execute operations comprising:
 receiving input data for real time execution of a plurality of data models;
 assigning an application instance for executing the plurality of data models simultaneously;

automatically distributing resources of the application instance based on a set of rotation factors;
executing the plurality of data models simultaneously;
outputting execution results for one or more of the plurality of data models;
determining whether a rotation factor is time-dependent; and
responsive to determining that the rotation factor is time-dependent,
  determining whether a rotation attribute of a rotation factor is associated with a trend;
  responsive to determining that the rotation attribute is associated with the trend, calculating the trend as part of attribute data associated with the rotation attribute;
  applying a lag weight to the attribute data associated with the rotation attribute;
  normalizing the attribute data associated with the rotation attribute across the plurality of data models; and
  applying an attribute weight to the normalized attribute data.

38. A non-transitory computer readable medium comprising programming instructions for rotating real time execution of data models using an application instance, the programming instructions configured to cause a processing system to execute operations comprising:
receiving input data for real time execution of a plurality of data models;
assigning an application instance for executing the plurality of data models simultaneously;
automatically distributing resources of the application instance based on a set of rotation factors;
executing the plurality of data models simultaneously;
outputting execution results for one or more of the plurality of data models; and
determining metric data associated with rotation data;
wherein:
  the metric data includes an overall historical aggregate, a historical aggregate by period, a recent history of the application instance, a weighted period input, and a time independent input,
  the overall historical aggregate includes historical data aggregated across periods over time,
  the historical aggregate by period includes the historical data aggregated by a period over time,
  the recent history of the application instance includes real-time information aggregated by the application instance,
  the weighted period input is received for assigning a weight to a data model by the period, and
  the time independent input includes a value for the data model that is time insensitive.

* * * * *